(12) United States Patent
Shiogai et al.

(10) Patent No.: US 11,479,193 B2
(45) Date of Patent: Oct. 25, 2022

(54) BUMPER

(71) Applicant: HONDA ACCESS CORP., Niiza (JP)

(72) Inventors: Ryo Shiogai, Niiza (JP); Seiko Fukuda, Niiza (JP); Takashi Yuzawa, Niiza (JP); Masahiro Abe, Niiza (JP); Jun Takada, Niiza (JP)

(73) Assignee: HONDA ACCESS CORP., Niiza (JP)

( * ) Notice: Subject to any disclaimer, the term of this patent is extended or adjusted under 35 U.S.C. 154(b) by 152 days.

(21) Appl. No.: 17/080,020

(22) Filed: Oct. 26, 2020

(65) Prior Publication Data

US 2021/0213898 A1 Jul. 15, 2021

(30) Foreign Application Priority Data

Jan. 9, 2020 (JP) .............................. JP2020-002470

(51) Int. Cl.
*B60R 19/02* (2006.01)
(52) U.S. Cl.
CPC ................................. *B60R 19/023* (2013.01)
(58) Field of Classification Search
CPC .............................. B62D 35/00; B60R 19/023
See application file for complete search history.

(56) References Cited

U.S. PATENT DOCUMENTS 8,297,685 B2 * 10/2012 Wolf .................... B62D 35/005
296/180.1

FOREIGN PATENT DOCUMENTS

| JP | 2007-283810 A | 11/2007 |
| JP | 2008-201156 A | 9/2008 |
| JP | 5522254 B2 | 6/2014 |
| JP | 2017-65445 A | 4/2017 |
| JP | 2019-77334 A | 5/2019 |
| JP | 2019-177848 A | 10/2019 |

* cited by examiner

*Primary Examiner* — D Glenn Dayoan
*Assistant Examiner* — Melissa Ann Bonifazi
(74) *Attorney, Agent, or Firm* — WHDA, LLP

(57) ABSTRACT

Provided is a bumper capable of improving a maneuvering stability of a vehicle. The bumper is a front bumper 7 to be attached to a front lower portion of a vehicle 1. Flow-straightening protrusions 31 each formed along a vehicular front-rear direction are provided on a lower portion of the front bumper 7 in a way such that they are aligned along a vehicular width direction across a region on an extended line 36 of a vehicular width direction inner end portion 2T of each of front wheels 2L, 2R of the vehicle 1. Thus, the occurrence of turbulent flows around the front wheels 2L, 2R can be restricted so that a vehicle stability can be improved.

6 Claims, 21 Drawing Sheets

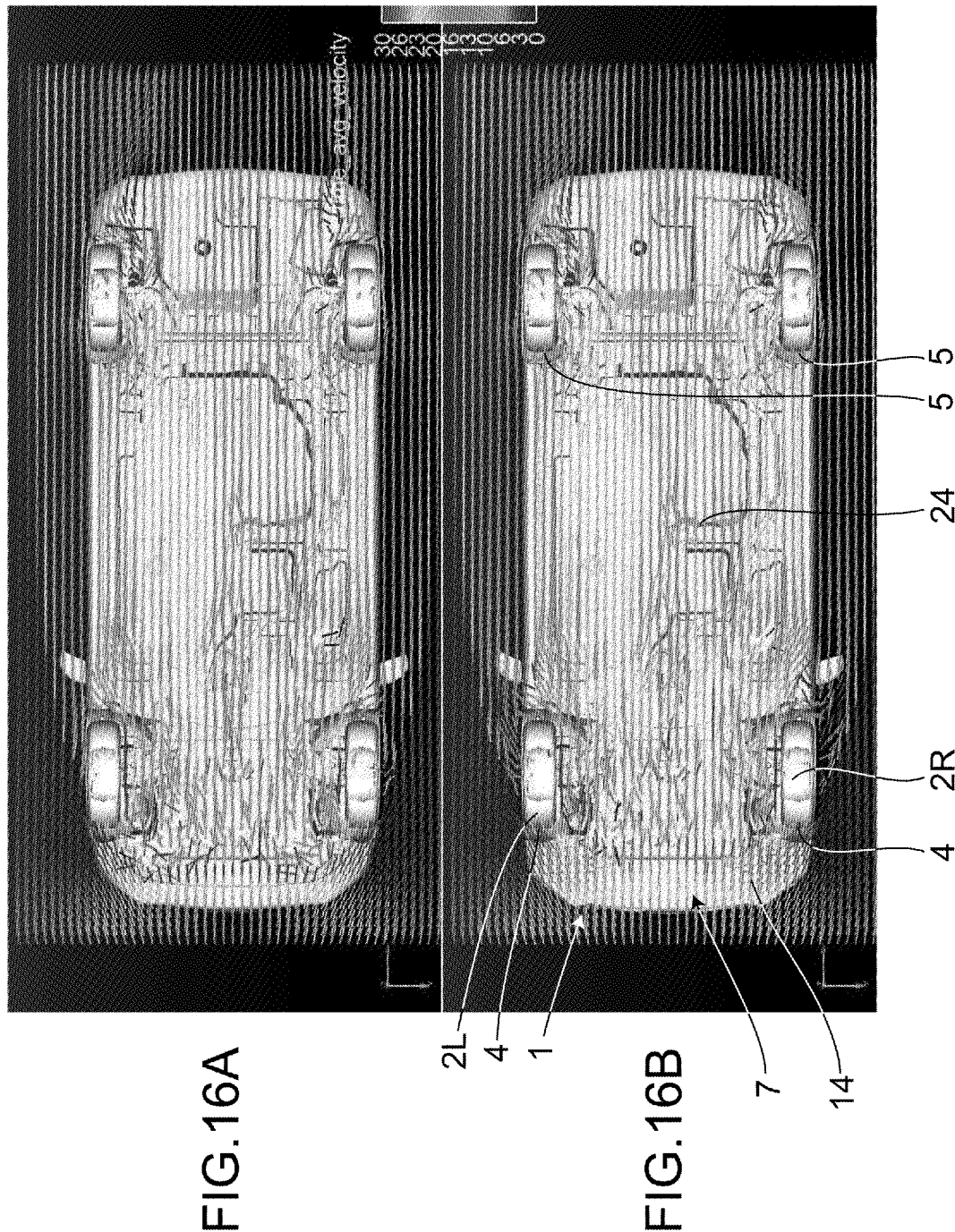

BUMPER

BACKGROUND OF THE INVENTION

Field of the Invention

The present invention relates to a bumper to be attached to a lower portion of a vehicle.

Background Art

The purpose of a vehicular front underfloor structure is to realize desired improvements in aerodynamic performance by reducing an air resistance owing to the traveling wind flowing around the front underfloor while the vehicle is running.

SUMMARY OF THE INVENTION

It is known that a front-rear balance of lift force is optimized to improve a vehicle stability and responsiveness at the time of driving at a high speed. It has also been proven via calculations using computational fluid analysis that the pressure around tires changes significantly.

Complex pressures are present around tires as a thermal energy owing to brakes or the like is involved, and the tires themselves are rotating objects. Novel findings based on studies conducted by the inventors have made it possible to further improve the lift force balance by straightening a turbulent region beforehand, and thus restricting changes in pressures inside wheel wells, utilizing the properties of the aero basic lift force.

FIG. 34 is a bottom view of a conventional vehicle in a running state, in which analysis results of a lower portion of the vehicle by computational fluid dynamics are shown. Here, the running state corresponds to a state in which the vehicle runs straight under a traveling wind condition involving a traveling wind parallel to a vehicular front-rear direction. As shown in this drawing, a self-propelled vehicle 101 has left and right front wheels 102L, 102R; and left and right rear wheels 103L, 103R. Provided on the left and right sides of the vehicle 101 are front and rear wheel wells 104, 104, 105, 105 for housing these front wheels 102L, 102R and rear wheels 103L, 103R.

As indicated by the flows of the wind surrounding the vehicle 101 in FIG. 34, higher pressures were observed around the wheel wells 104, 104, 105, 105 housing the front wheels 102L, 102R and the rear wheels 103L, 103R, and turbulent flows were confirmed to have occurred around these wheel wells. The following test was then performed on the presumption that these turbulent flows derived from wind flows at a lower portion of the vehicle body will remain inside the wheel wells 104, 104, 105, 105, and then be discharged from a wheel opening section of each tire as a rotating part.

The vehicle was actually driven with the wheel opening section being entirely covered by a cover, and effects in a maneuvering stability were studied. As a result, it was confirmed that a high-speed straight driving stability may be improved with the wheel opening sections of all the four wheels being covered. Since this effect may vary depending on various vehicle body shapes, it is considered that the effect contributes to changes in the front-rear balance of CL values (coefficient of lift force).

Further, for comparison, the effect contributed to the maneuvering stability in a lesser degree when only the wheel opening sections of the rear tires were covered by a cover as compared to when the wheel opening sections of all the four wheels were covered. From this result, it became clear through the actual driving test that the maneuvering stability could be improved by mainly reducing the turbulent flows around the front wheels. Moreover, as for a cover(s) to be attached to the wheel opening sections of the rear tires, it is difficult to entirely cover these wheel opening sections due to heat damages caused by brakes or the like; the present invention was made after carrying out an actual driving test using another method.

Here, it is an object of the present invention to provide a bumper capable of improving a maneuvering stability of a vehicle.

In order to achieve the abovementioned object, the invention of a first aspect is a bumper to be attached to a front lower portion of a vehicle. This bumper includes: flow-straightening protrusions that are each formed along a vehicular front-rear direction, and are aligned on a lower portion of the bumper along a vehicular width direction, wherein the flow-straightening protrusions are aligned across a region on an extended line of a vehicular width direction inner end portion of a front wheel of the vehicle.

Further, the invention of a second aspect is a bumper to be attached to a front lower portion of a vehicle. This bumper includes: flow-straightening groove portions that are each formed along a vehicular front-rear direction, and are aligned on a lower portion of the bumper along a vehicular width direction, wherein the flow-straightening groove portions are aligned across a region on an extended line of a vehicular width direction inner end portion of a front wheel of the vehicle.

Furthermore, the invention of a third aspect is a bumper including: a side surface portion; and a side surface-side flow-straightening protrusion that is formed along the vehicular front-rear direction, and is provided on the side surface portion in a manner such that the side surface-side flow-straightening protrusion is arranged ahead of an upper portion of a side surface of the front wheel of the vehicle.

According to the structure of the first aspect, a vehicle stability can be improved by restricting the occurrence of the turbulent flows around the front wheels.

According to the structure of the second aspect, the vehicle stability can be improved by restricting the occurrence of the turbulent flows around the front wheels.

According to the structure of the third aspect, the vehicle stability can be improved by straightening the turbulent flows outside the front wheels in a vehicular width direction.

BRIEF DESCRIPTION OF THE DRAWINGS

FIG. 16(A) is a diagram showing flows of a travelling wind flowing at a lower portion of the vehicle in the comparative embodiment.

FIG. 16(B) is a diagram showing flows of a travelling wind flowing along a lower portion of the vehicle in the first embodiment of the present invention.

DETAILED DESCRIPTION OF THE INVENTION

Figure 1:
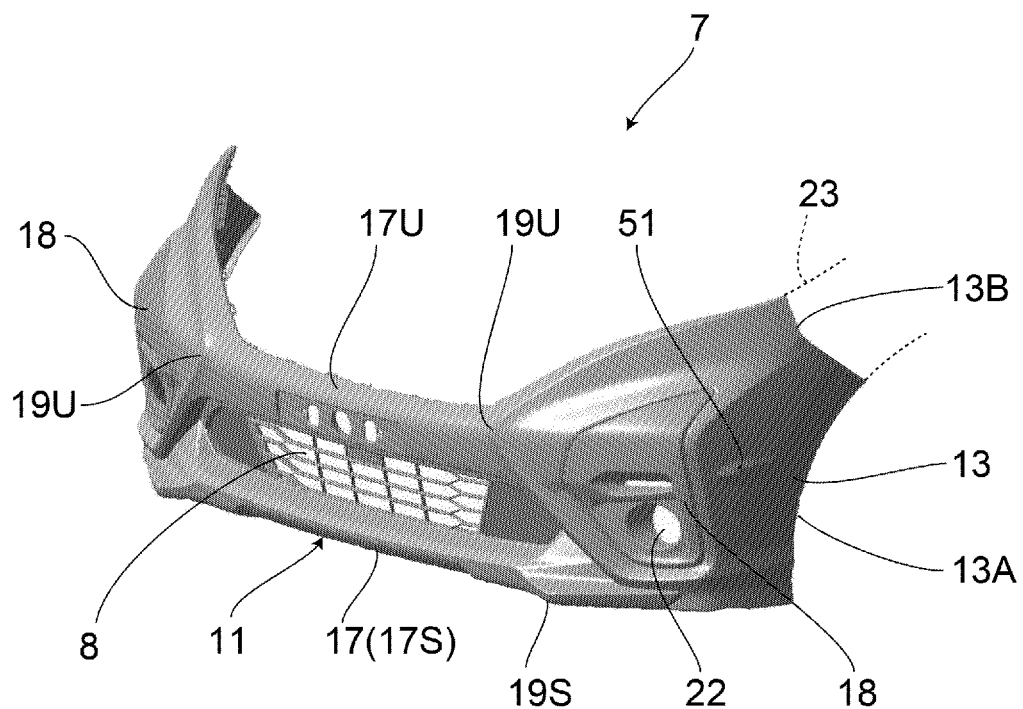
FIG. 1 is a perspective view of a bumper of a first embodiment of the present invention.

Embodiments of a bumper of the present invention are described hereunder with reference to drawings.

First Embodiment

FIGS. 1 to 17 show a first embodiment of the present invention. As shown in these drawings, a self-propelled vehicle 1 has a left and right front wheels 2L, 2R; and a left and right rear wheels 3L, 3R. Front and rear wheel wells 4, 4, 5, 5 for housing these front wheels 2L, 2R and rear wheels 3L, 3R are provided on the left and right sides of the vehicle 1.

A front bumper 7 as a front resin member is provided at a front portion of the vehicle 1. This front bumper 7 is formed of a resin using a mold. Further, provided on the front bumper 7 is an opening section 8 allowing an external air to flow into the vehicle 1 so as to cool a radiator or the like.

The front bumper 7 integrally has a bumper front surface 11; bumper side surfaces 13, 13 provided on a left and right end portions of the bumper front surface 11; and a bumper bottom surface 14 provided at lower portions of the bumper front surface 11 and the bumper side surfaces 13, 13.

Figure 2:
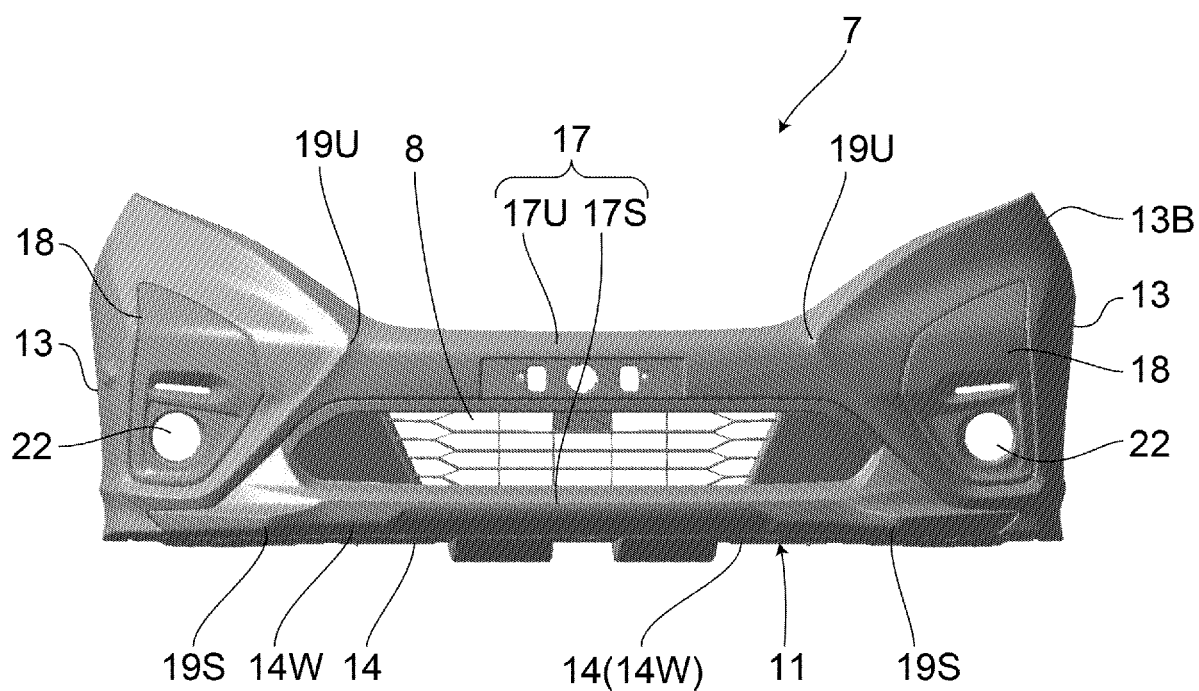
FIG. 2 is a front view of the bumper of the first embodiment of the present invention.

As shown in FIG. 2, for example, the bumper front surface 11 integrally has a bumper front surface central portion 17 formed long in a left-right direction; and bumper front surface slanted portions 18, 18 connecting both end portions of the bumper front surface central portion 17 in a vehicular width direction and the bumper side surfaces 13, 13. Here, the opening section 8 is formed in a central area of the bumper front surface central portion 17 in a height direction.

Further, the bumper front surface central portion 17 is composed of a bumper front surface central upper portion 17U as a portion above the opening section 8; and a bumper front surface central lower portion 17S as a portion below the opening section 8.

Figure 3:
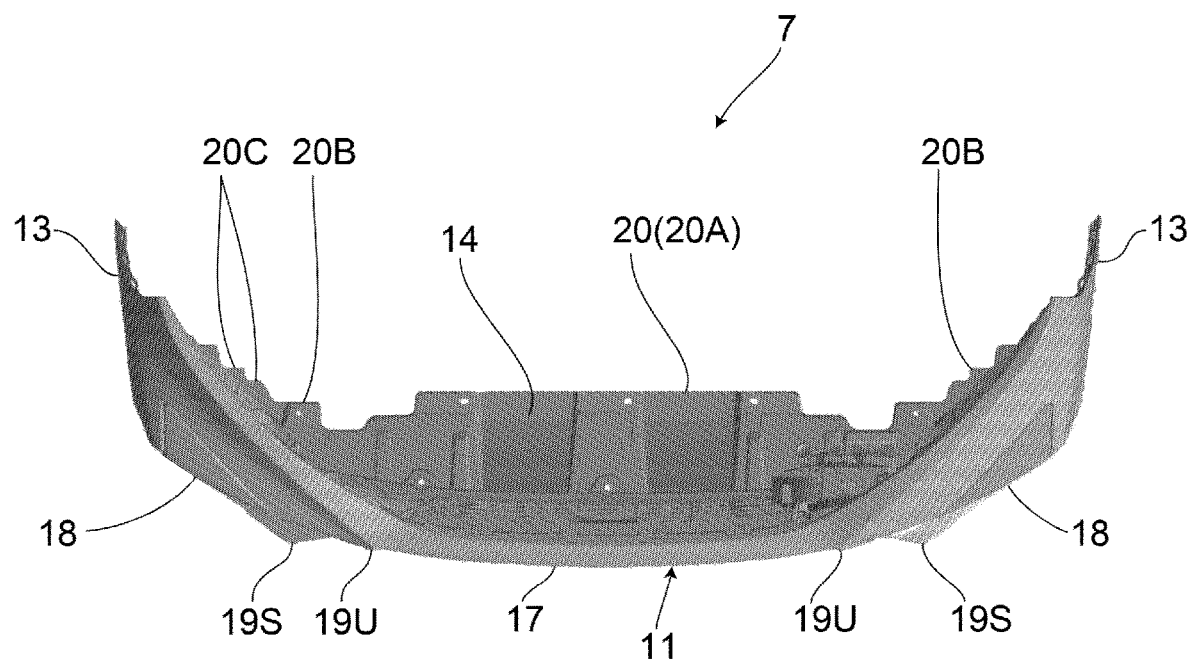
FIG. 3 is a top view of the bumper of the first embodiment of the present invention.

In addition, as shown in FIG. 3, for example, the front surface of the bumper front surface central upper portion 17U and the front surface of the bumper front surface central lower portion 17S are formed either in a linear shape or in a curved shape with a large radius of curvature in the vehicular width direction orthogonal to a vehicular front-rear direction. Bent portions 19U, 19U, 19S, 19S are provided between the end portions of the bumper front surface central upper portion 17U and bumper front surface central lower portion 17S and the bumper front surface slanted portions 18, 18. These bumper front surface slanted portions 18, 18 are slanted rearward as they reach outward in the vehicular width direction.

With respect to the positions of the bent portions 19U, 19U of the bumper front surface central upper portion 17U, the bent portions 19S, 19S of the bumper front surface central lower portion 17S are provided outward in the vehicular width direction. Further, the left and right bent portions 19S, 19S are provided ahead of inner wall surfaces 4N, 4N of wheel wells 4, 4 in the vehicular front-rear direction; the bent portion(s) 19S and the inner wall surface(s) 4N are arranged in a way such that they are substantially aligned in the vehicular front-rear direction.

The front side of the bumper bottom surface 14 is continuous with the lower portion of the bumper front surface central lower portion 17S. A curved portion 14W is provided between the bumper front surface central lower portion 17S, bumper front surface slanted portion(s) 18, bumper side surface(s) 13 and the bumper bottom surface 14.

A fog lamp opening section 22 as an opening section for installing a fog lamp 21 is formed at each of the bumper front surface slanted portions 18, 18 on both sides. The fog lamp 21 is installed in such fog lamp opening section 22.

At a rear upper end portion of each bumper side surface 13, there is formed a coupling portion 13B to be coupled to a fender 23 (see FIG. 1) located behind the bumper 7. By coupling such coupling portion 13B to the fender 23, the front bumper 7 can then be supported by the vehicle 1. Further, provided at the rear end of each bumper side surface 13 is a rear edge portion 13A serving as part of the front side of each of the wheel wells 4, 4 of the front wheels 2L, 2R.

As shown in FIGS. 15(A), 15(B), 16(A) and 16(B), the bumper bottom surface 14 of the front bumper 7 is arranged in a way such that it is continuous with the front edge of a floor member 24 provided on the lower side of the vehicle 1; the lower surface of the bumper bottom surface 14 and a lower surface of the floor member 24 on the front edge side thereof are flush and continuous with each other. The floor member 24 is extended in the vehicular width direction, and is formed into a substantially flat shape i.e. the floor member 24 overall has a gentle curvature with abrupt concavities and convexities being restricted except for the wheel wells 4, 5. In this case, the floor member 24 may be in the form of either a single piece or multiple pieces that are disposed in a continuous manner.

Figure 4:
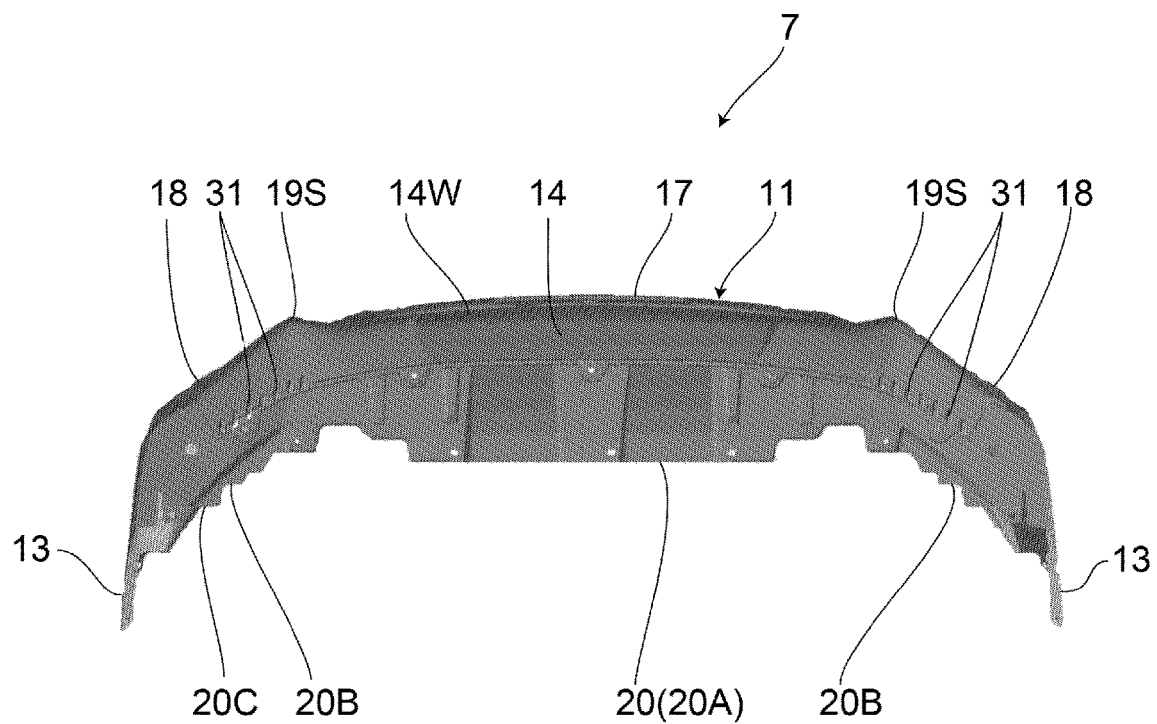
FIG. 4 is a bottom view of the bumper of the first embodiment of the present invention.

As shown in FIGS. 3 and 4, for example, a rear edge portion 20 of the bumper bottom surface 14 includes a rear edge central portion 20A located in a central area thereof in the vehicular width direction; and a rear edge slanted portion 20B provided on both sides of the rear edge central portion 20A that are located outward in the vehicular width direction. The rear edge central portion 20A is formed into a linear shape in the vehicular width direction. The rear edge slanted portions 20B, 20B on both sides are formed in a manner such that they are slanted rearward as they reach outward in the vehicular width direction. Further, a plurality of step portions 20C, 20C . . . are formed at the rear edge slanted portions 20B, 20B.

Figure 12:
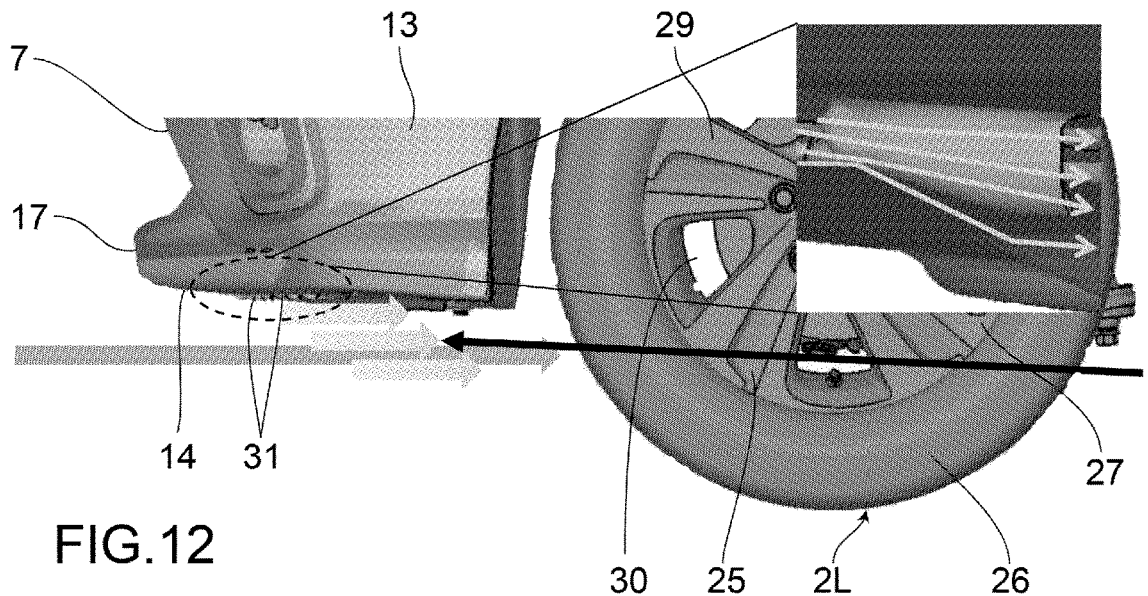
FIG. 12 is a side view illustrating a front side lower portion of the vehicle in the first embodiment of the present invention.
Figure 13:
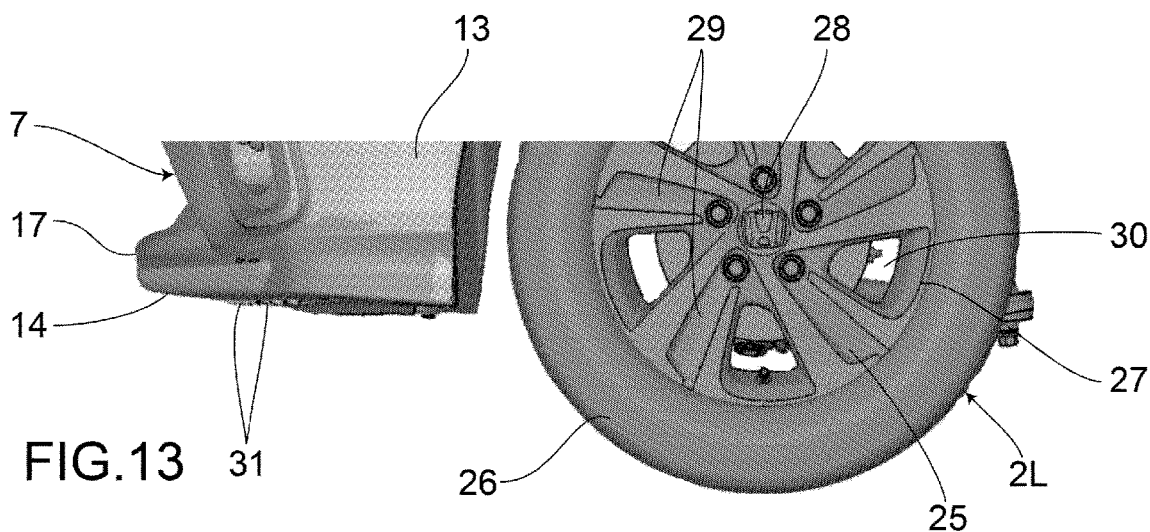
FIG. 13 is a side view showing main parts of the front side lower portion of the vehicle in the first embodiment of the present invention.

As shown in FIGS. 12 and 13, each of the front wheels 2L, 2R and rear wheels 3L, 3R has a wheel 25 made of an aluminum alloy or the like; and a tire 26 attached to the wheel 25. An axle (not shown) of the vehicle 1 is joined to the center of the wheel 25.

The wheel 25 has a rim portion 27 as an outer circumferential portion; a hub portion 28 as a central portion; a plurality of spoke portions 29, 29 . . . connecting the rim portion 27 and the hub portion 28; and opening sections 30, 30 . . . provided between these spoke portions 29, 29 . . . .

Figure 6:
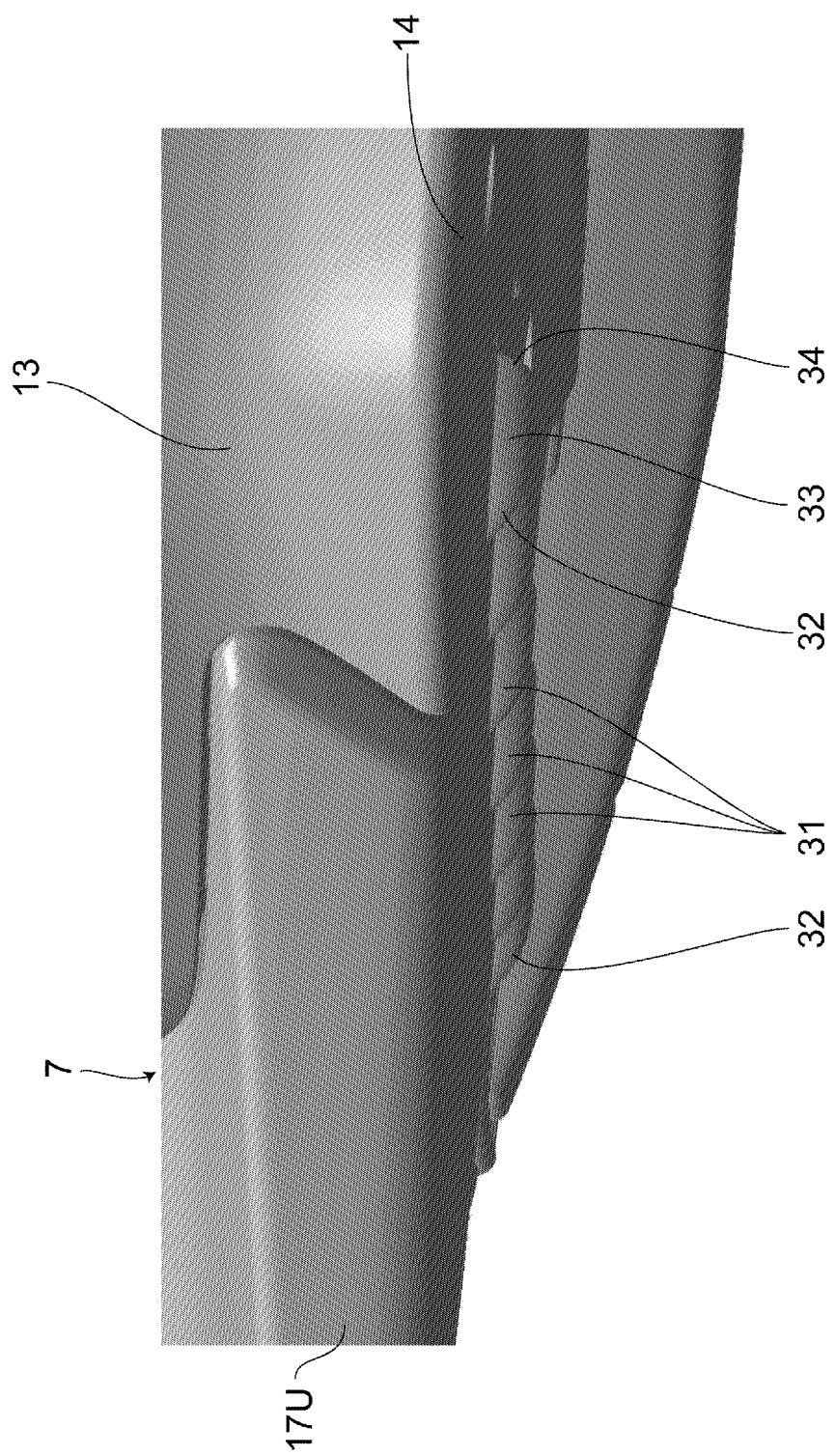
FIG. 6 is an enlarged side view showing main parts of the bumper of the first embodiment of the present invention.
Figure 7:
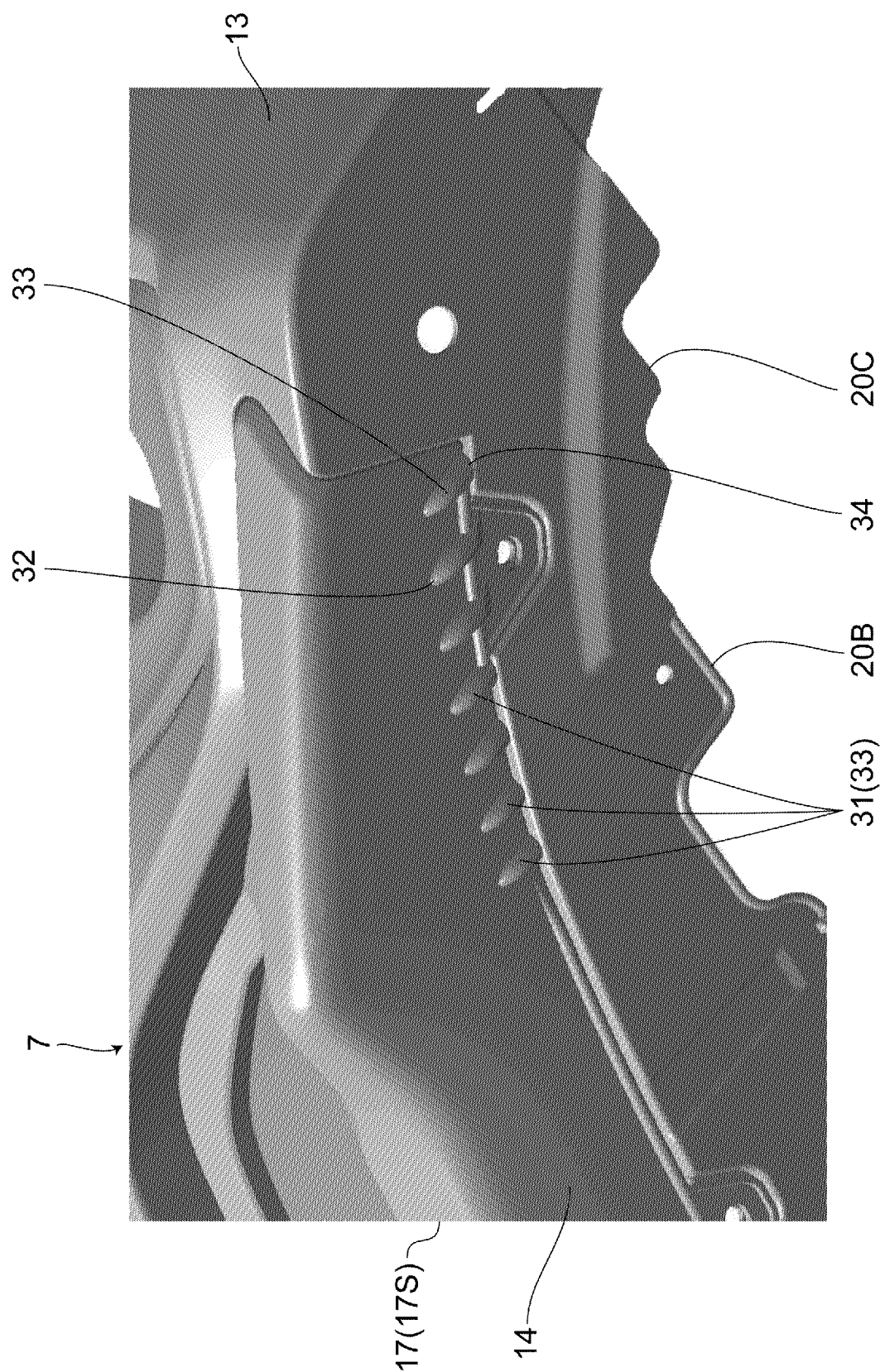
FIG. 7 is a perspective view showing parts around flow-straightening protrusions of the bumper of the first embodiment of the present invention.
Figure 8:
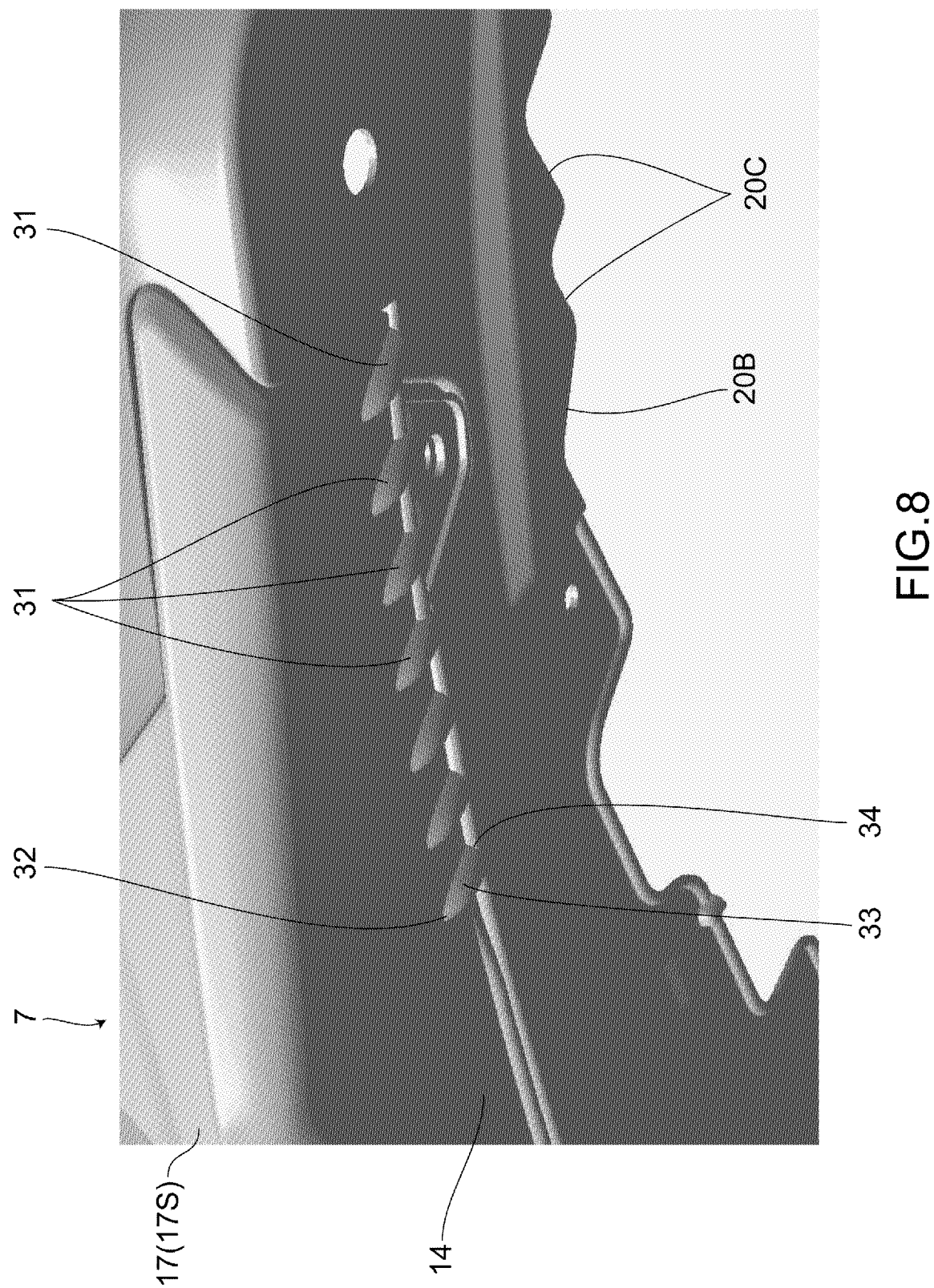
FIG. 8 is a perspective view showing parts around the flow-straightening protrusions of the bumper of the first embodiment of the present invention.

As shown in FIGS. 6 to 9, for example, provided on the lower surface of the bumper bottom surface 14 as a lower portion of the front bumper 7 are a plurality of flow-straightening protrusions 31 that are aligned at intervals in the vehicular width direction and are positioned ahead of the front wheels 2L, 2R (in this embodiment, each of the left and right sides is provided with seven flow-straightening protrusions 31). Each flow-straightening protrusion 31 is formed into a sharp-pointed bullet shape with a front end portion 32 thereof being sharpened toward the front side of the vehicle 1. The front end portion 32 has a curved shape; an outer circumferential surface 33 is a curved surface and has a substantially semicircular cross-sectional shape along the vehicular width direction. Further, as shown in FIG. 6, each flow-straightening protrusion 31 is formed in a slanted fashion such that the front end portion 32 side thereof is configured to be gradually expanded from the lower surface of the bumper bottom surface 14 toward the rear side of the vehicle. Here, the flow-straightening protrusions 31 are integrally formed on the front bumper 7.

The cross-sectional shape of each flow-straightening protrusion 31 in the vehicular width direction is at its maximum at a rear end portion 34 thereof in the vehicular front-rear direction. A protrusion width of the flow-straightening protrusion 31 at the rear end portion 34 is substantially identical to a protrusion interval between the rear end portions 34, 34 of the adjacent flow-straightening protrusions 31, 31; the protrusion width is about 0.8 to 1.2 times the size of the protrusion interval. Here, as compared to the protrusion width at the rear end portion 34, the flow-straightening protrusion 31 is formed longer in the front-rear direction; the length of the flow-straightening protrusion 31 is not larger than 150 mm.

Figure 9:
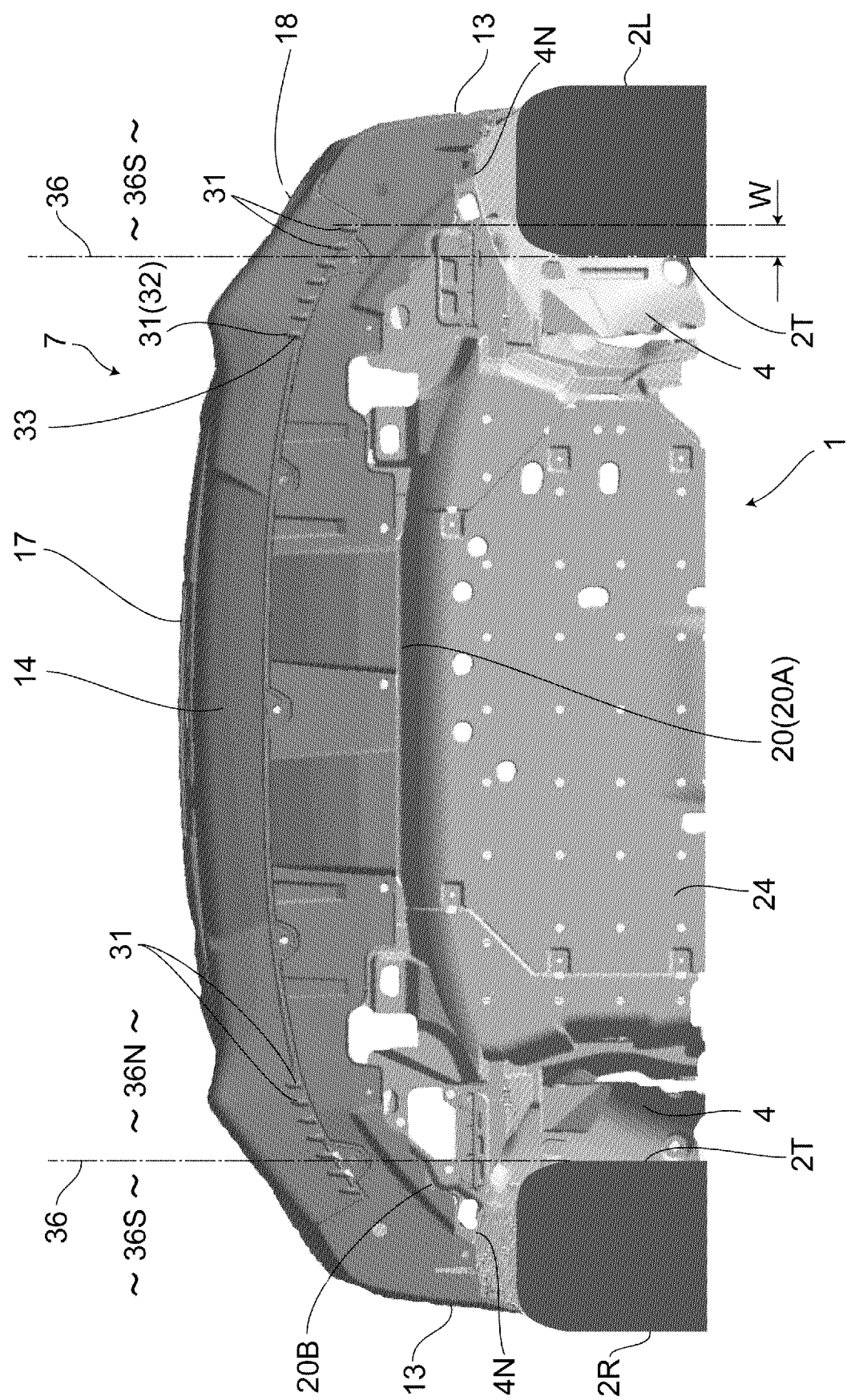
FIG. 9 is a bottom view showing an attached state of the bumper of the first embodiment of the present invention.
Figure 10:
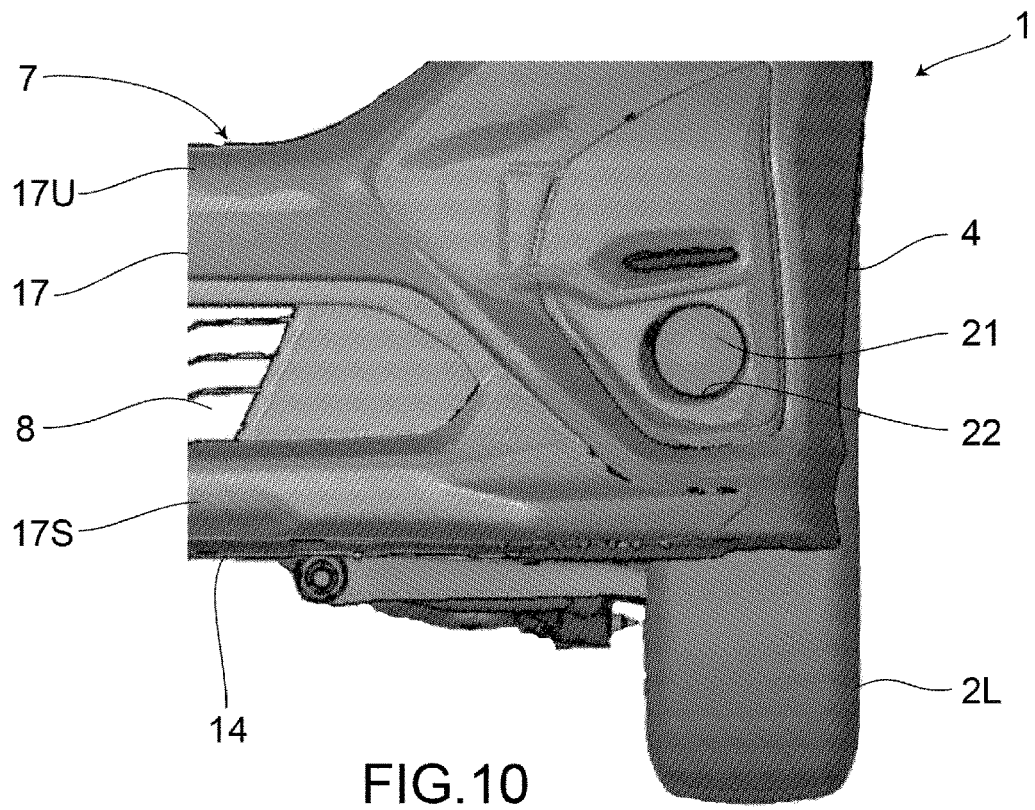
FIG. 10 is a front view showing main parts of a vehicle in the first embodiment of the present invention.

Further, as shown in FIG. 9, for example, the plurality of the flow-straightening protrusions 31, 31 . . . are aligned in a curved fashion such that they are gradually positioned rearward from a center side toward an outer side in the vehicular width direction. The bullet-shaped flow-straightening protrusions 31 are aligned in a row in the vehicular width direction in a manner such that the row of the flow-straightening protrusions 31 covers a region on a virtual extended line 36 and is sharply slanted toward the front side of the vehicle as it approaches an inner side in the vehicular width direction. In addition, as shown in FIG. 6, since the flow-straightening protrusions 31, 31 . . . that are adjacent to one another in the width direction are arranged in a tightly overlapping fashion in the front-rear direction, there can be achieved a flow-straightening effect where the straightness of an airflow is ensured. Further, the plurality of the flow-straightening protrusions 31, 31 . . . are disposed in a way such that the flow-straightening protrusions 31 on the outer side in the vehicular width direction are arranged rearward in the vehicular front-rear direction as compared to those on the center side in the vehicular width direction.

Moreover, as shown in FIG. 9, with the front wheels 2L, 2R being directed to a front-rear direction of the vehicle 1 running straight, the plurality of the flow-straightening protrusions 31, 31 are aligned across the region on the extended line 36 of a vehicular width direction inner end portion 2T of each of the front wheels 2L, 2R. A part beyond the extended line 36 that is located on the center side in the vehicular width direction is defined as an inner region 36N; a part beyond the extended line 36 that is located on the outer side in the vehicular width direction is defined as an outer region 36S. Here, the extended line 36 is an extended line of an inner surface of each of the front wheels 2L, 2R in the vehicular width direction. In this embodiment, the extended line 36 is located between the second flow-straightening protrusion 31 from the outer side in the vehicular width direction and the third flow-straightening protrusion 31 from the outer side in the same direction; two flow-straightening protrusions 31 are provided in each of the outer regions 36S on the left and right sides; five flow-straightening protrusions 31 are provided on each of the left and right sides in the inner region 36N. Particularly, in the case of a modified embodiment shown in FIG. 11 where the arrangement of the flow-straightening protrusions 31 is different, one flow-straightening protrusion 31 is provided in each of the outer regions 36S on the left and right sides. However, it is preferred that multiple flow-straightening protrusions 31, 31 . . . be provided in each outer region 36S as shown in FIG. 9.

Further, the multiple flow-straightening protrusions 31, 31 . . . in the inner region 36N are actually positioned on a front side of a part on a center side in the vehicular width direction as compared to the vehicular width direction inner end portion 2T of the wheel well 4. The flow-straightening protrusions 31 in the outer region 36S are arranged in a way such that one or more flow-straightening protrusions 31 are provided in a range of a width W corresponding to one third or smaller, preferably one fourth or smaller of the width of each of the front wheels 2L, 2R from the vehicular width direction inner end portion 2T; it is preferred that multiple flow-straightening protrusions 31 be provided in the range of the width W. In this way, a straightened airflow can be delivered into a part of the wheel well 4 that is located on the inner side of the vehicular width direction inner end portion 2T without unnecessarily coming into direct contact with the front wheels 2L, 2R.

Figure 5:
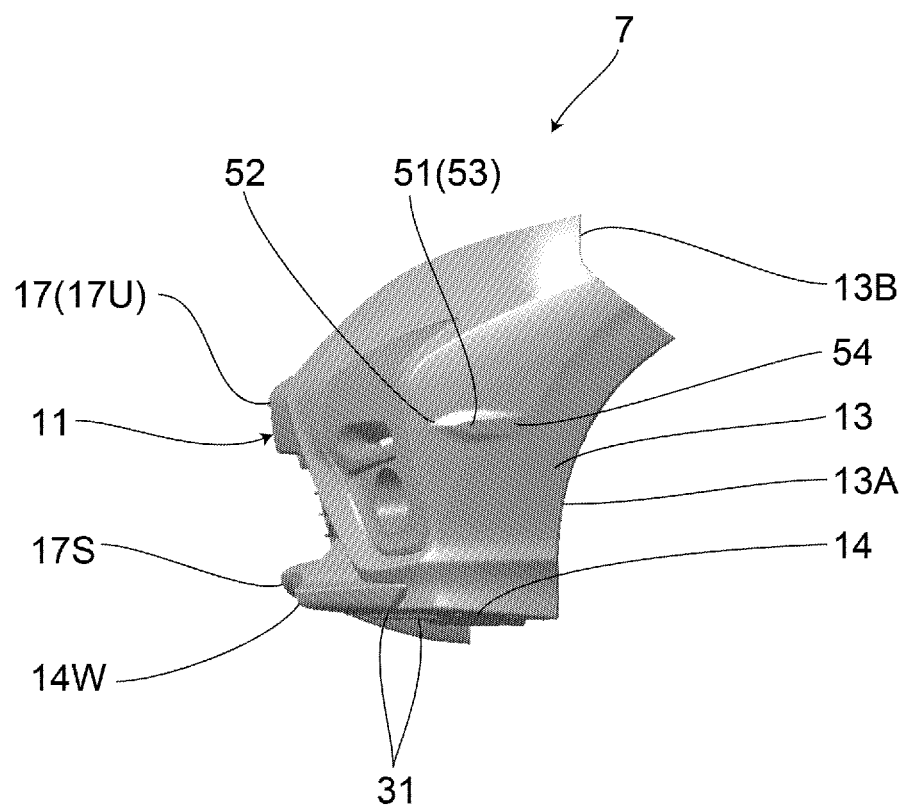
FIG. 5 is a side view of the bumper of the first embodiment of the present invention.

Moreover, a numerical symbol "51" in FIG. 5 represents a side surface-side flow-straightening protrusion which shall be described in detail in a later-described third embodiment.

Figure 14:
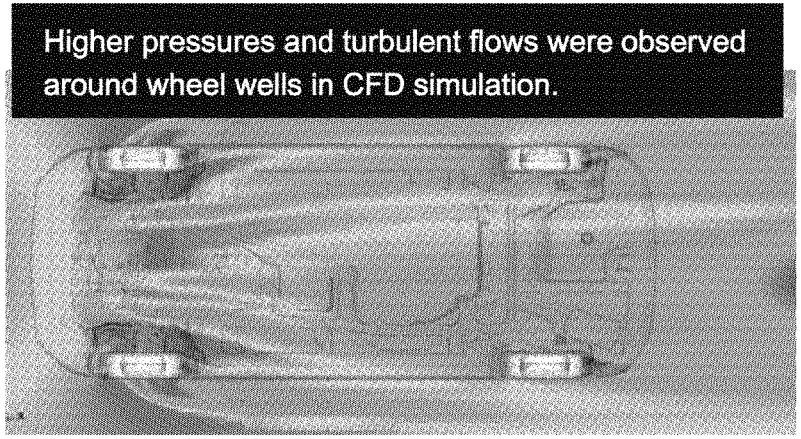
FIG. 14 is a diagram showing flows of a traveling wind flowing along a lower portion of the vehicle under a conventional configuration.
Figure 15A:
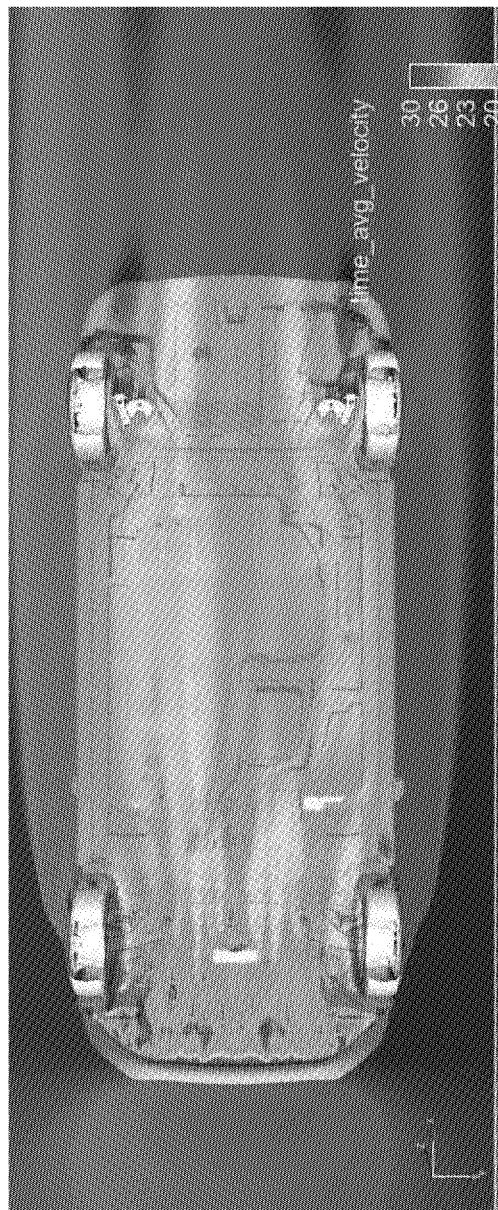
FIG. 15(A) is a diagram showing flows of a travelling wind flowing along a lower portion of the vehicle and a velocity distribution thereof in a comparative embodiment.
Figure 15B:
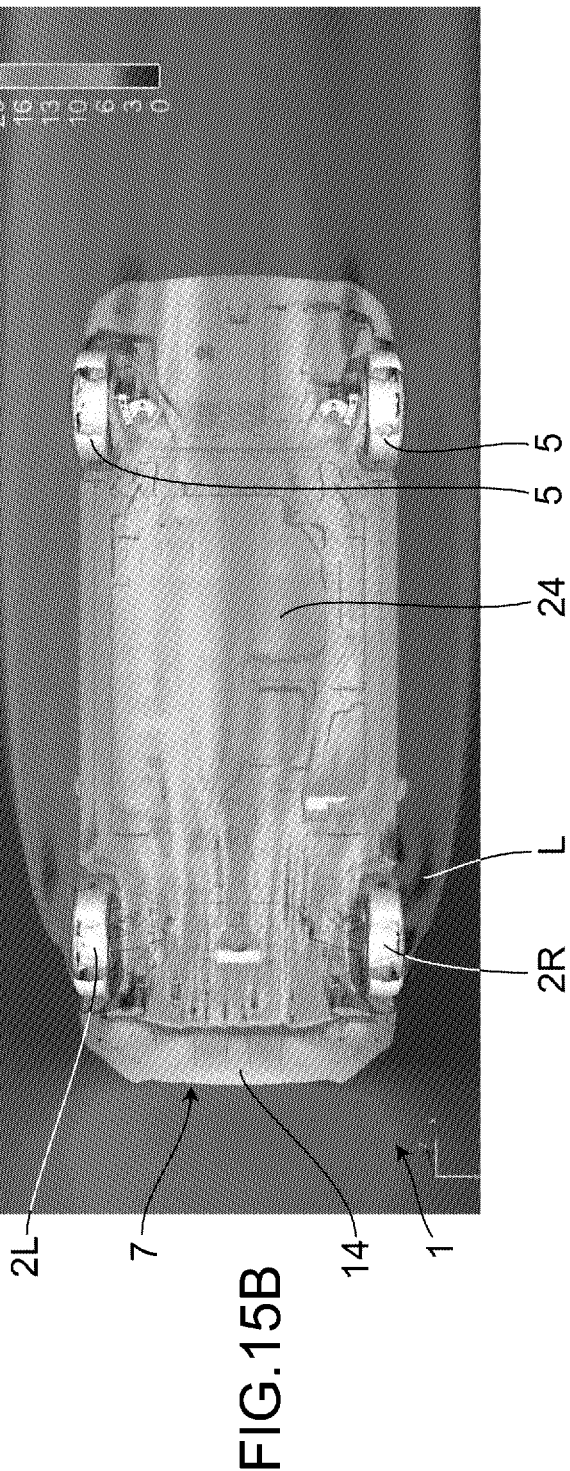
FIG. 15(B) is a diagram showing flows of a travelling wind flowing at a lower portion of the vehicle and a velocity distribution thereof in the first embodiment of the present invention.
Figure 17:
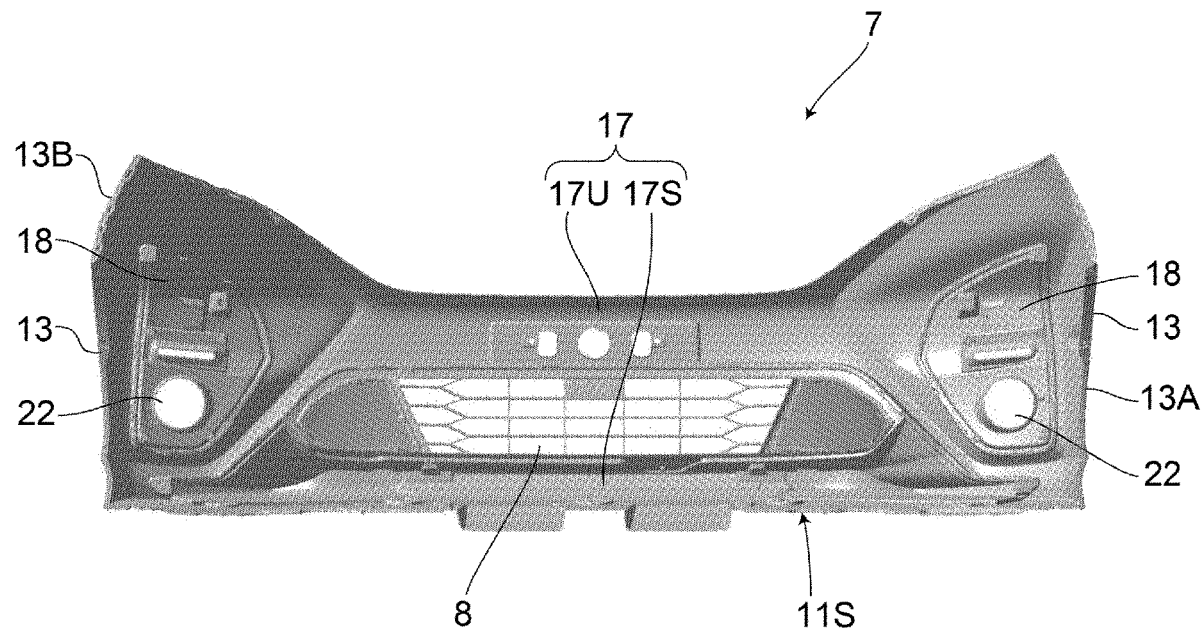
FIG. 17 is a back view of the bumper of the first embodiment of the present invention.
Figure 18:
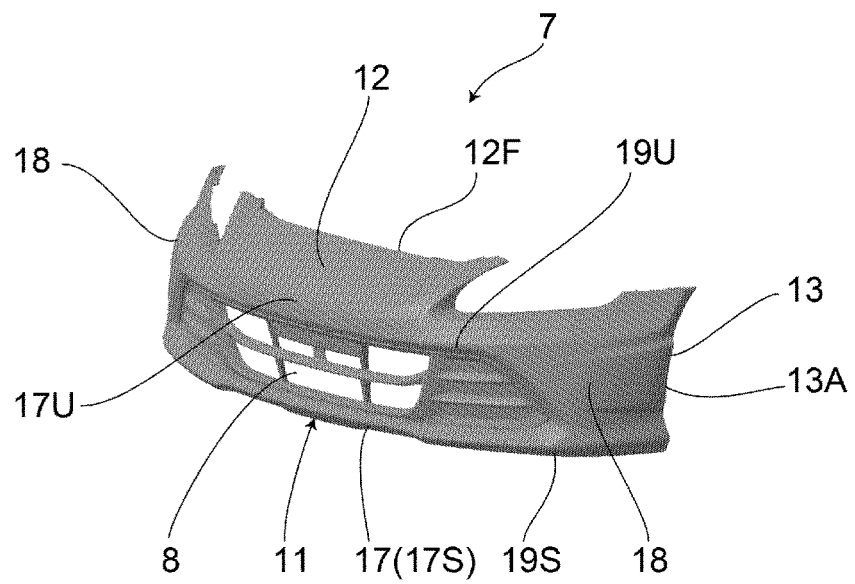
FIG. 18 is a perspective view of a bumper of a second embodiment of the present invention.
Figure 19:
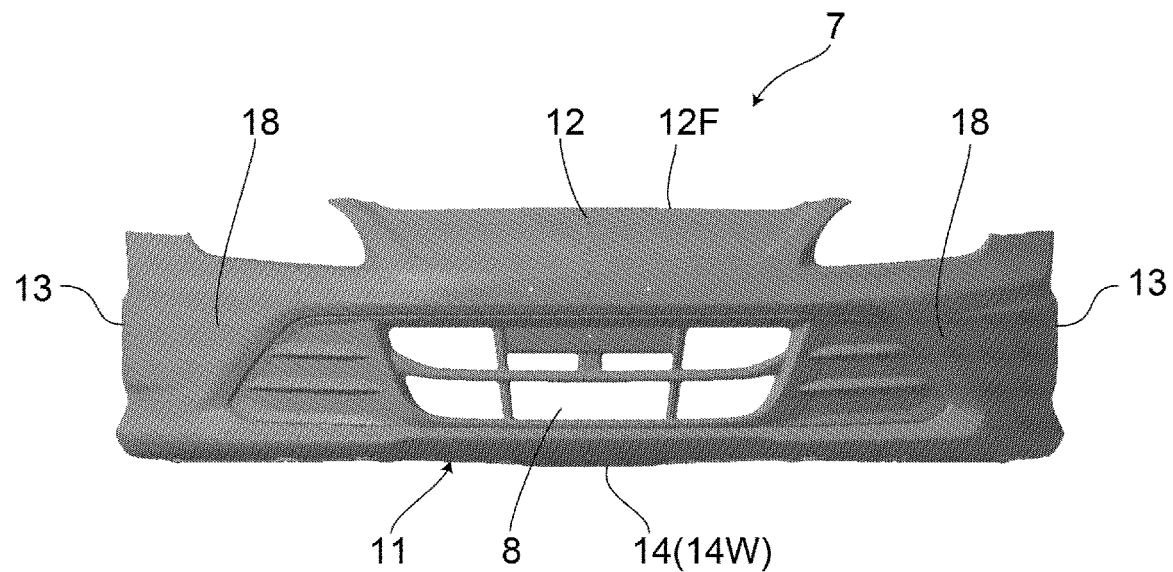
FIG. 19 is a front view of the bumper of the second embodiment of the present invention.
Figure 20:
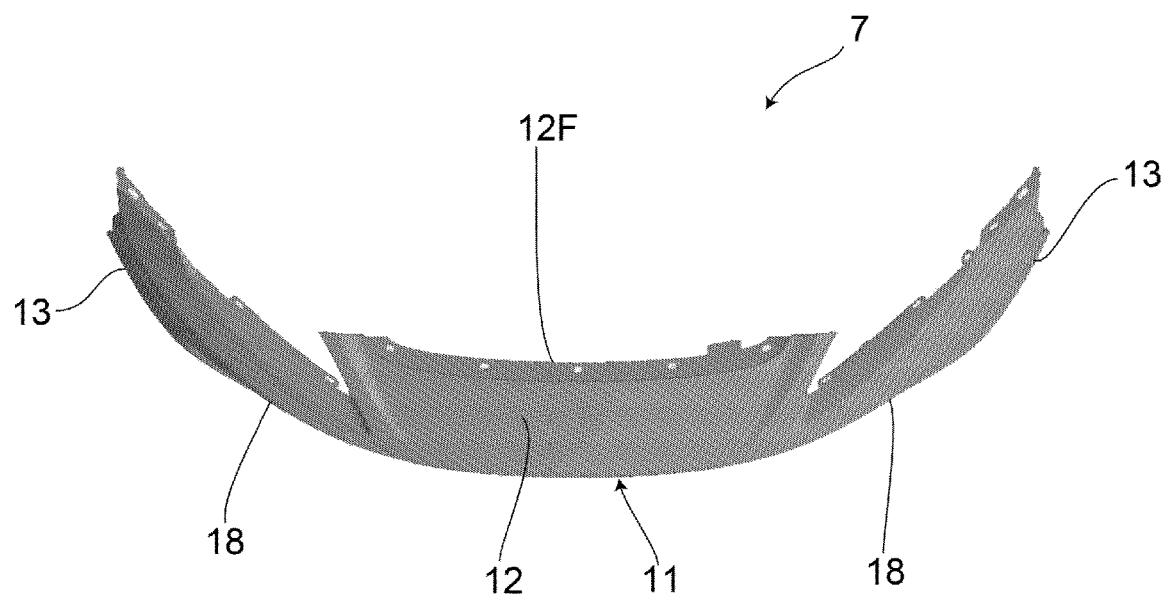
FIG. 20 is a top view of the bumper of the second embodiment of the present invention.
Figure 21:
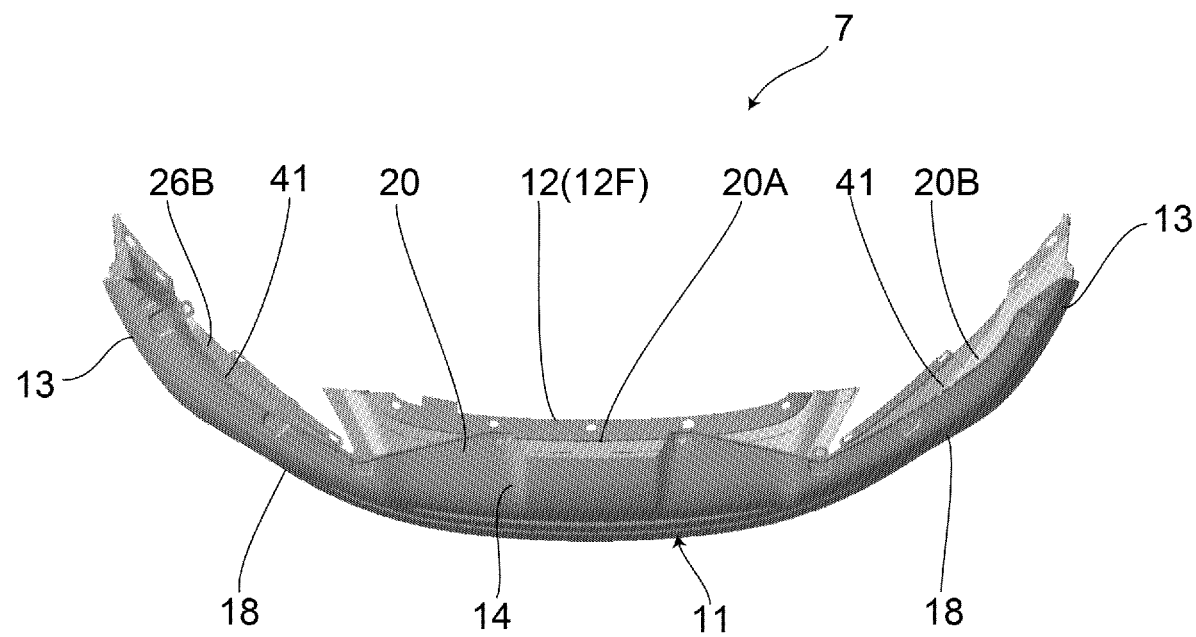
FIG. 21 is a bottom view of the bumper of the second embodiment of the present invention.
Figure 22:
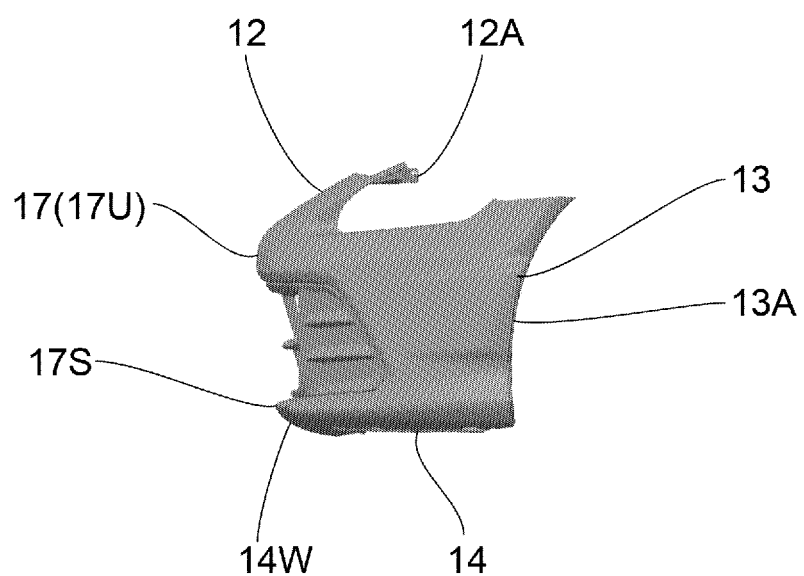
FIG. 22 is a side view of the bumper of the second embodiment of the present invention.
Figure 23:
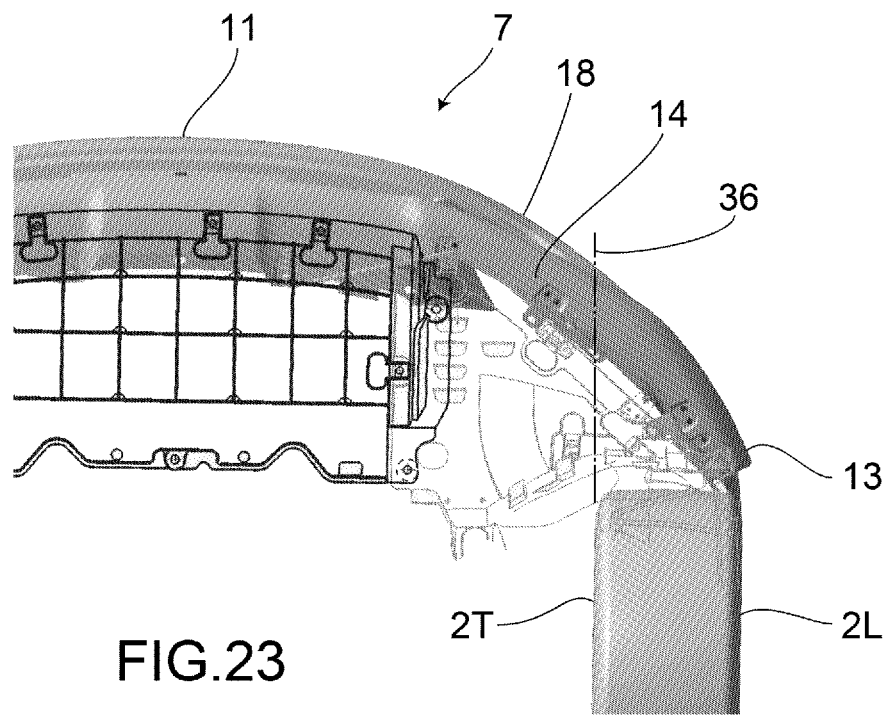
FIG. 23 is an explanatory bottom view of the bumper of the second embodiment of the present invention.
Figure 24:
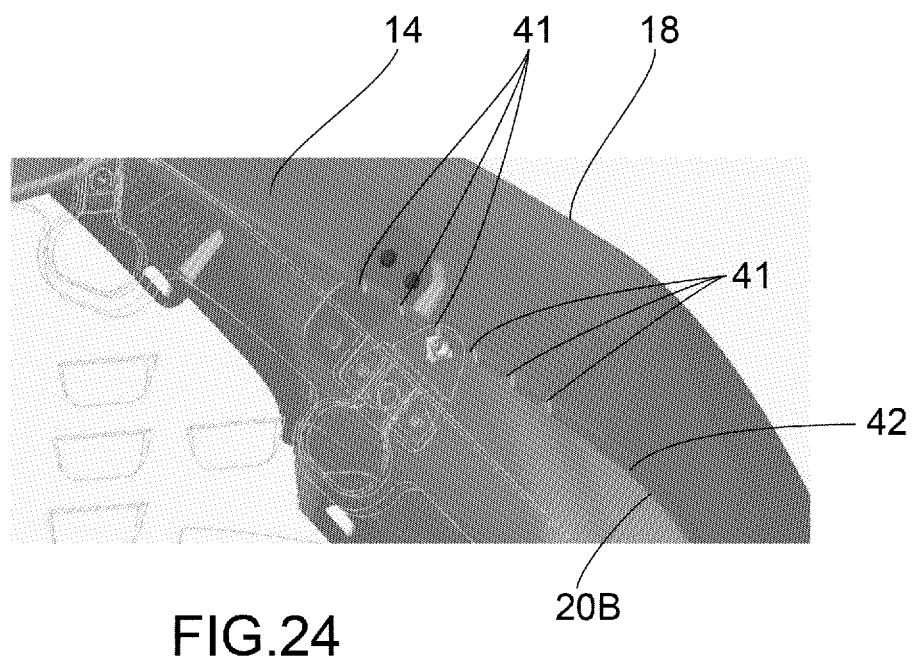
FIG. 24 is an enlarged explanatory bottom view of the bumper of the second embodiment of the present invention.

FIGS. 14 to 16 show analysis results of the lower portion of a running vehicle by computational fluid dynamics. FIGS. 14, 15(A) and 16(A) represent a comparative embodiment; FIGS. 15(B) and 16(B) represent the present embodiment. As compared to FIG. 15(A) representing the comparative embodiment, FIG. 15(B) representing the present embodiment shows that a low-velocity area L exhibiting a low velocity occurred outside the front wheels 2L, 2R. The reason that the low-velocity area L occurs is because a turbulent flow(s) that has occurred in the wheel wells 4 as a result of running the vehicle will be discharged to the outer side of the vehicle 1 in the width direction thereof.

Figure 11:
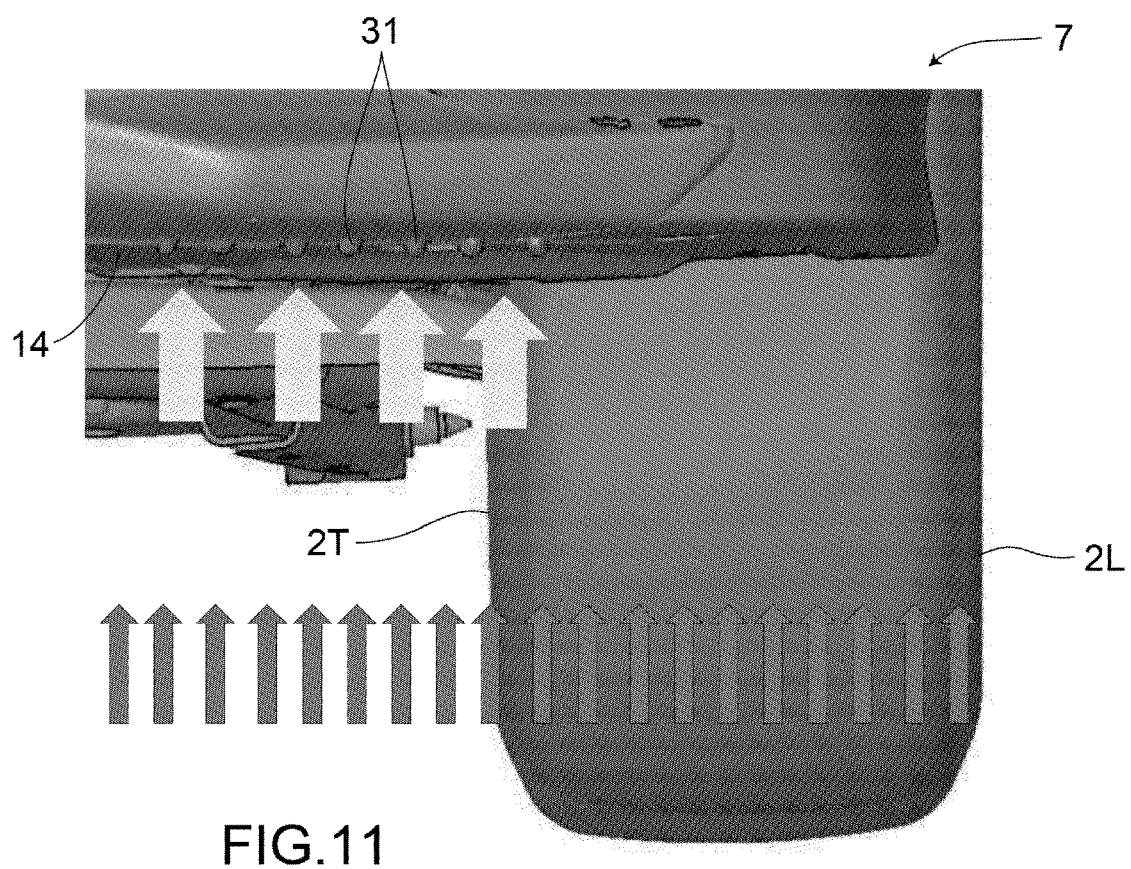
FIG. 11 is a front view showing main parts of the vehicle on a lower portion side thereof in the first embodiment of the present invention.

This is explained with reference to FIG. 11. In FIG. 11, thin arrows on the lower side represent normal airflows when the flow-straightening protrusions 31 are not provided; these airflows shall enter the wheel wells 4 and then turn into turbulent flows without being straightened. In this regard, as indicated by wide arrows on the upper side in the FIG. 11, airflows shall be straightened by the plurality of the flow-straightening protrusions 31, the straightened airflows will then enter the wheel wells 4 so that the turbulent flows thereinside can then be discharged to the outer side. Thus, a traveling performance and a steering performance can be improved by restricting the occurrence of the turbulent flows around the front wheels 2L, 2R.

Here, since the flow-straightening protrusions 31 are capable of collecting as well as dispersing the airflows, the straightened airflows shall flow into parts inwardly beyond the vehicular width direction inner end portion 2T in each wheel well 4, thereby allowing the turbulent flows inside the wheel well 4 to be discharged to the outer side of the wheel well 4 in the vehicular width direction, and thus making it possible to change a pressure inside the wheel well 4 which has acted as a hindrance to the motion of a suspension stroke. Therefore, a smooth suspension stroke can be delivered such that the traveling performance can be improved.

That is, the present embodiment corresponds to a first aspect of the present invention. The present embodiment is to provide the front bumper 7 as a bumper to be attached to the front lower portion of the vehicle 1. The flow-straightening protrusions 31 each formed along the vehicular front-rear direction are provided on the lower portion of the front bumper 7 in the way such that they are aligned along the vehicular width direction across the region on the extended line 36 of the vehicular width direction inner end portion 2T of each of the front wheels 2L, 2R of the vehicle 1. Thus, the occurrence of the turbulent flows around the front wheels 2L, 2R can be restricted so that a vehicle stability can be improved.

The effects of the present embodiment are as follows. Each flow-straightening protrusion 31 is formed into the sharp-pointed bullet shape with the front end portion 32 thereof being sharpened toward the front side of the vehicle 1, the front end portion 32 is formed into a curved shape in a bottom view, and the outer circumferential surface 33 is a curved surface and has a semicircular cross-sectional shape along the vehicular width direction, thereby resulting in less air resistance and achieving a desired flow-straightening effect. Further, the protrusion width of the flow-straightening protrusion 31 at the rear end portion 34 is substantially identical to the protrusion interval between the rear end portions 34, 34 of the adjacent flow-straightening protrusions 31, 31, and the protrusion width is about 0.8 to 1.2 times the size of the protrusion interval, thereby achieving a superior flow-straightening effect of collecting and then dispersing the airflows, and thus allowing the turbulent flows remaining in the wheel well 4 to be effectively discharged. Further, one or more flow-straightening protrusions 31, preferably multiple flow-straightening protrusions 31 are arranged in each of the left and right outer regions 36S (two each on the left and right); and multiple flow-straightening protrusions 31 of a number larger than that of those in each outer region 36S (five each on the left and right), preferably flow-straightening protrusions 31 of a number equal to or larger than twice the number of those in each outer region 36S are arranged on each of the left and right sides in the inner region 36N. Thus, the straightened airflows can be delivered into the vehicular width direction inner end portion 2T of each of the front wheels 2L, 2R, and into a part of each wheel well 4 that is located on the inner side of the vehicular width direction inner end portion 2T in the vehicular width direction, thereby allowing the turbulent flows therein to be effectively discharged to the outer side in the vehicular width direction. Further, by disposing three or more flow-straightening protrusions 31 at intervals in the vehicular width direction on each of the left and right sides, one flow-straightening protrusion 31 can be provided on each of the left and right sides in the inner region 36N, and two flow-straightening protrusions 31 which are more than those on each of the left and right sides in the inner region 36N can be provided in each of the left and right outer regions 36S.

Second Embodiment

FIGS. 18 to 31 show a second embodiment of the present invention. Elements identical to those in the first embodiment are given identical symbols, and the descriptions thereof are thus omitted. As shown in these drawings, the front bumper 7 of this embodiment integrally has a bumper upper surface 12 provided on the upper portion of the bumper front surface 11. This bumper upper surface 12 is formed in a manner such that it is enlarged rearward at the center of the front bumper 7. Further, in a state where an engine hood (not shown) of the vehicle 1 is closed, a rear edge 12F of the bumper upper surface 12 is engaged with a front end edge of this engine hood.

Further, in the front bumper 7 of this embodiment, the left and right bumper side surfaces 13, 13 are formed in a slanted manner such that a distance therebetween is larger rearward, and the fog lamp opening section 22 is not provided.

Formed on the lower surface of the rear edge slanted portions 20B as a rear edge of the bumper bottom surface 14 is a protruding stripe portions 42 protruding downward. Aligned on this protruding stripe portion 42 are a plurality of flow-straightening groove portions 41 (six each on the left and right in this embodiment) that are located ahead of the front wheels 2L, 2R and are arranged at intervals in the vehicular width direction; the intervals between the adjacent flow-straightening groove portions 41 are identical to one another. Each flow-straightening groove portion 41 is formed by denting the lower surface of the protruding stripe portion 42 to a substantially semicircular shape. Further, the height of the bottom portion of each flow-straightening groove portion 41 is substantially identical to that of the lower surface of the bumper bottom surface 14. Here, the length of the flow-straightening groove portion 41 is not longer than 50 mm in the vehicular front-rear direction.

In this embodiment, the extended line 36 is located between the first flow-straightening groove portion 41 from the outer side in the vehicular width direction and the second flow-straightening groove portion 41 from the outer side in the same direction; one flow-straightening groove portion 41 is provided in each of the outer regions 36S on the left and right sides; five flow-straightening groove portions 41 are provided on each of the left and right sides in the inner region 36N. Particularly, as is the case with the first embodiment, it is preferred that multiple flow-straightening groove portions 41 (two each on the left and right) be provided in each outer region 36S, and that multiple flow-straightening groove portions 41 (four each on the left and right) be provided in the inner region 36N.

Figure 25:
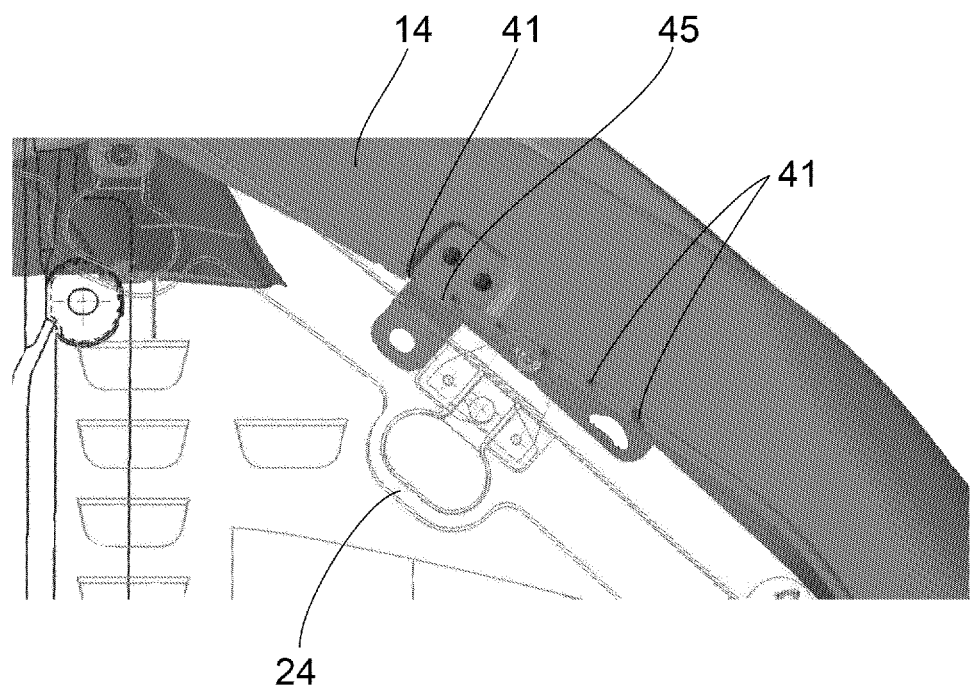
FIG. 25 is an enlarged explanatory bottom view of the bumper of the second embodiment of the present invention.
Figure 26:
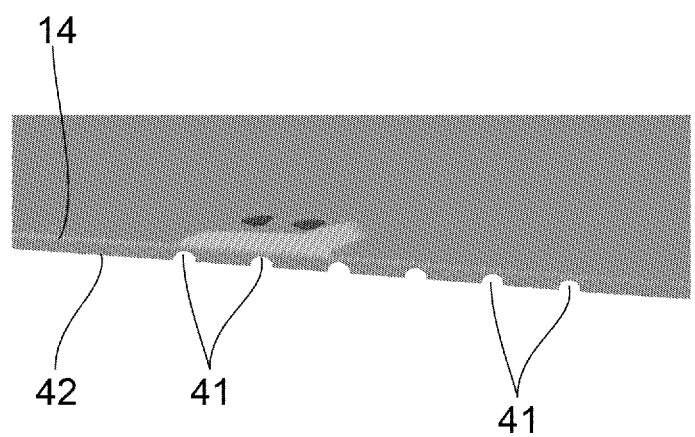
FIG. 26 is an explanatory view of flow-straightening groove portions of the bumper of the second embodiment of the present invention.
Figure 27:
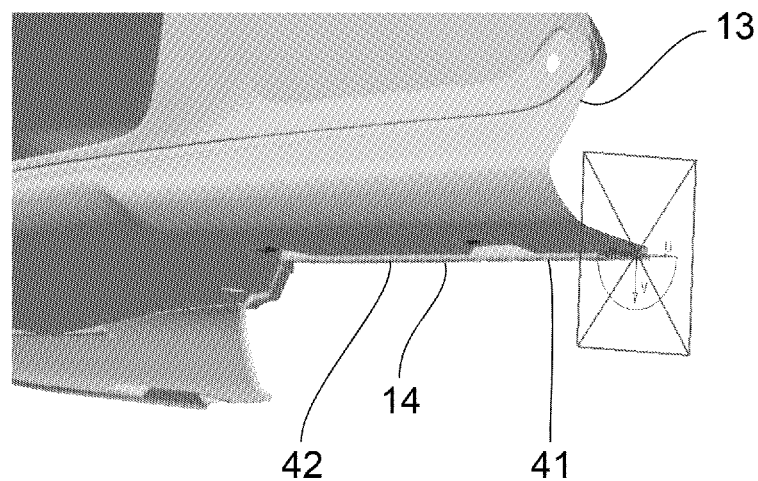
FIG. 27 is an explanatory view of a bumper bottom surface of the bumper of the second embodiment of the present invention.
Figure 28:
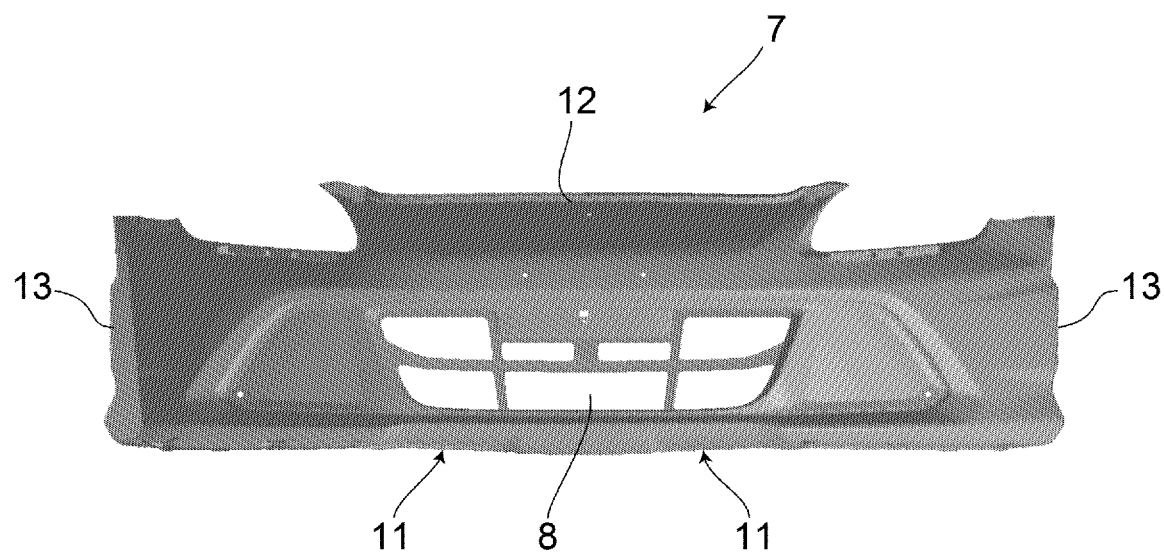
FIG. 28 is a back view of the bumper of the second embodiment of the present invention.
Figure 29:
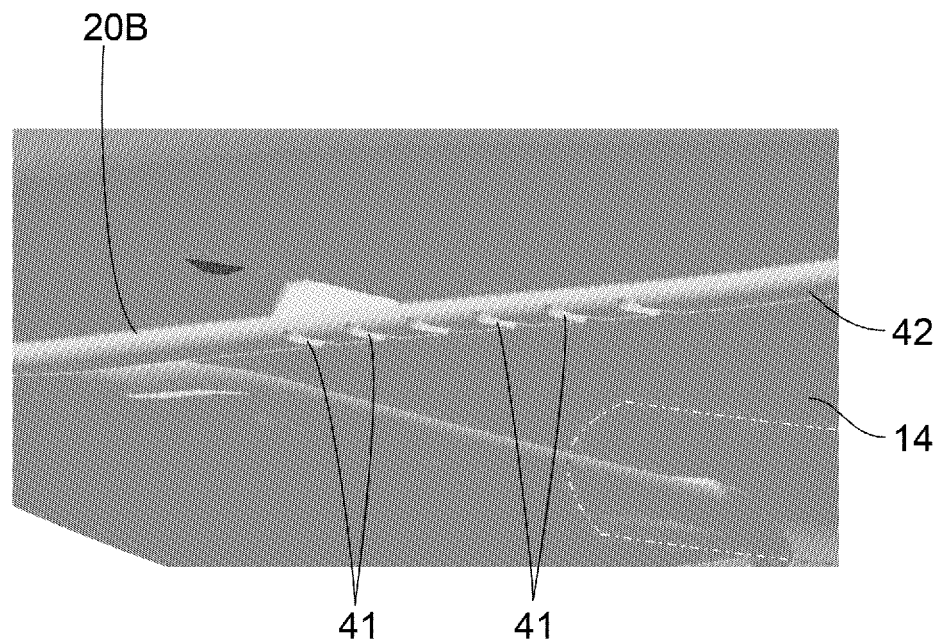
FIG. 29 is a perspective view showing parts around the flow-straightening groove portions of the bumper of the second embodiment of the present invention.
Figure 30:
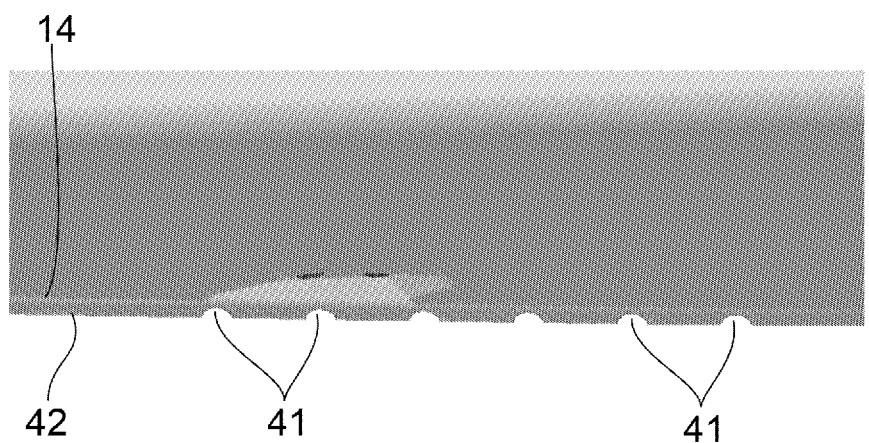
FIG. 30 is an explanatory view of the flow-straightening groove portions of the bumper of the second embodiment of the present invention.
Figure 31:
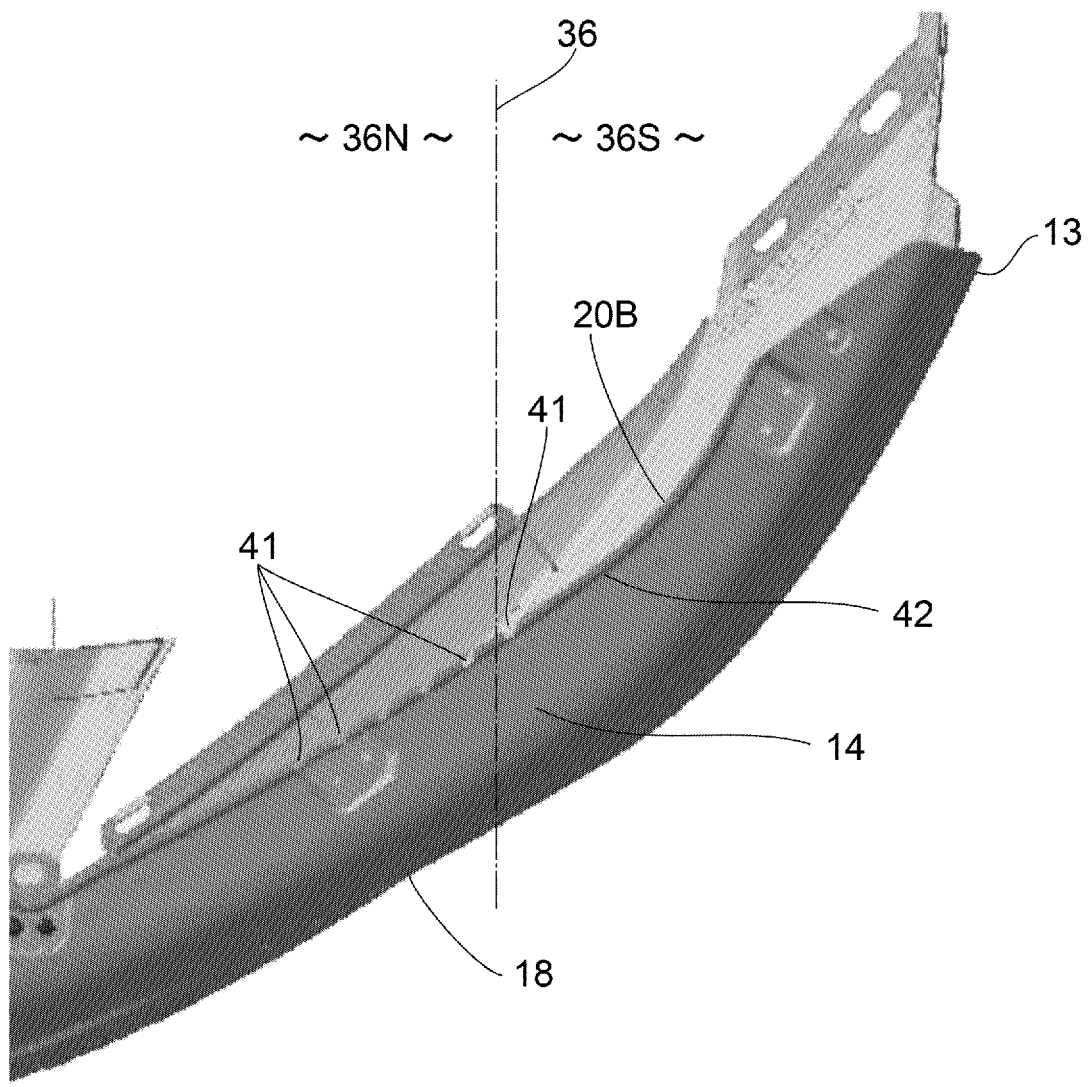
FIG. 31 is an enlarged bottom view showing main parts of the bumper of the second embodiment of the present invention.

Here, a numerical symbol "45" in the drawings represents a coupling tool for coupling together the bumper bottom surface 14 and the floor member 24 (see FIG. 25). This coupling tool 45 is attached to the bumper bottom surface 14.

That is, the present embodiment corresponds to a second aspect of the present invention. The present embodiment is to provide the front bumper 7 to be attached to the front lower portion of the vehicle 1. Provided on the lower portion of the front bumper 7 are the flow-straightening groove portions 41 that are aligned along the vehicular width direction across the region on the extended line 36 of the vehicular width direction inner end portion 2T of each of the front wheels 2L, 2R of the vehicle 1, each of the flow-straightening groove portions 41 being formed along the vehicular front-rear direction. Thus, the occurrence of the turbulent flows around the front wheels 2L, 2R can be restricted so that the vehicle stability can be improved.

The effects of the present embodiment are as follows. There is formed the protruding stripe portion 42 protruding downward. Formed on this protruding stripe portion 42 are the multiple flow-straightening groove portions 41 (six each on the left and right) that are positioned ahead of the front wheels 2L, 2R and are aligned at intervals along the vehicular width direction. Thus, parts between the flow-straightening groove portions 41 are established as parts protruding downward. In this way, airflows that have flowed through the flow-straightening groove portions 41 and have thus been straightened will then flow into each wheel well 4. Further, one or more flow-straightening groove portions 41 are arranged in each of the left and right outer regions 36S; and multiple flow-straightening groove portions 41 of a number larger than that of those in each outer region 36S (three or more each on the left and right; five each on the left and right in this embodiment), preferably flow-straightening groove portions 41 of a number equal to or larger than twice the number of those in each outer region 36S are arranged on each of the left and right sides in the inner region 36N. Thus, the present embodiment can bring about functions and effects that are similar to those in the first embodiment.

Third Embodiment

Figure 32:
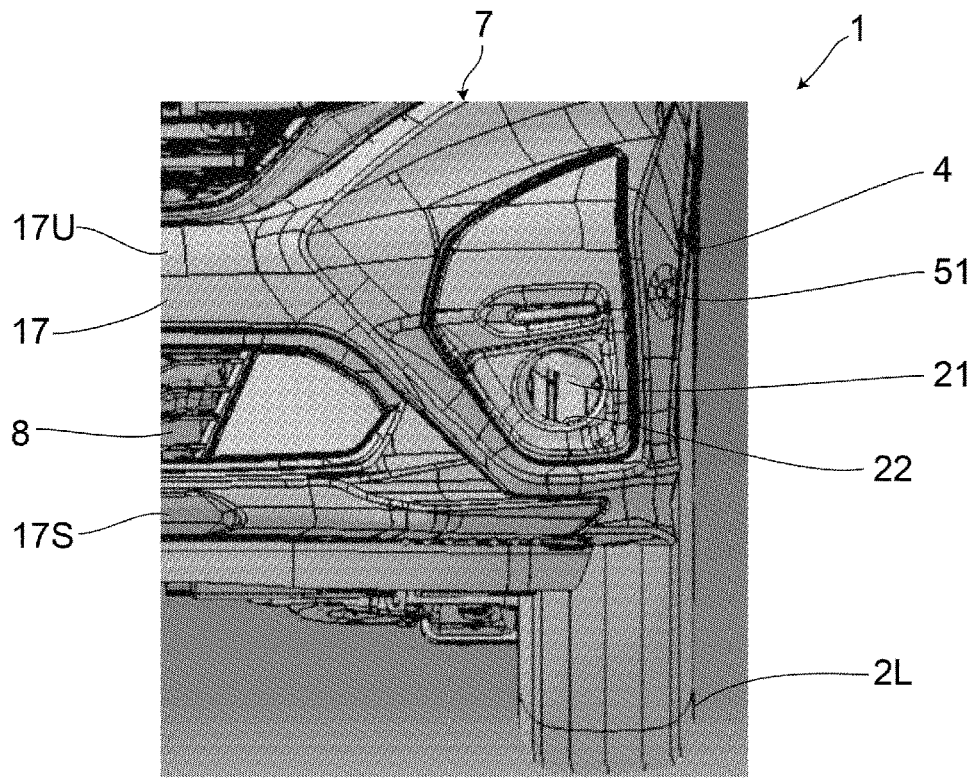
FIG. 32 is a front view showing main parts of a lower portion of a vehicle in a third embodiment of the present invention.
Figure 33:
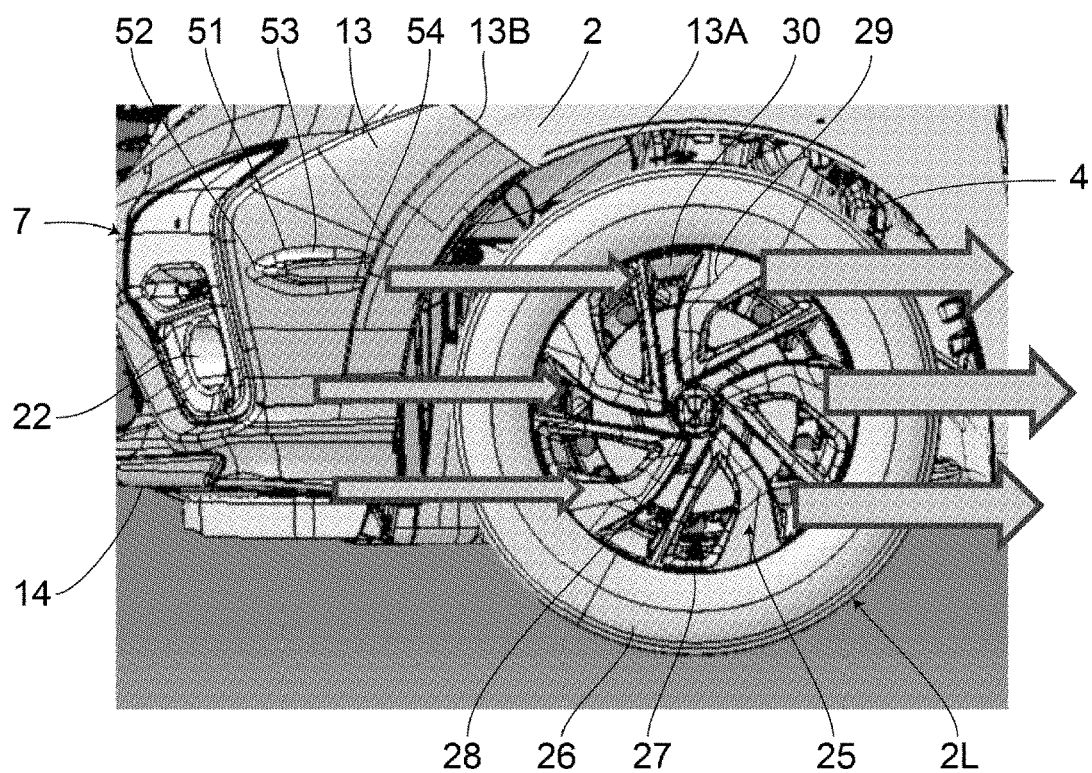
FIG. 33 is a side view showing a front side lower portion of the vehicle in the third embodiment.

FIGS. 32 and 33 show a third embodiment of the present invention. Elements identical to those in the above embodiments are given identical symbols, and the descriptions thereof are thus omitted. As shown in these drawings, the front bumper 7 of this embodiment has a basic structure identical to that of the first embodiment, in which the side surface-side flow-straightening protrusion 51 is provided on the outer surfaces of both the left and right bumper side surfaces 13 in a protruding manner.

As also shown in FIG. 5, each side surface-side flow-straightening protrusion 51 has a sharp-pointed front end portion 52; and a base end portion 53 that is integrally formed behind the front end portion 52 and has a vertical width shrinking rearward. A rear end edge portion 54 of the base end portion 53 is flush with the outer surface of the bumper side surface 13.

As shown in FIG. 33, the side surface-side flow-straightening protrusion 51 is arranged above a height position of the hub portion 28 on the side surface of each of the front wheels 2L, 2R. In this case, it is preferred that the side surface-side flow-straightening protrusion 51 be arranged at a height position between the hub portion 28 and the rim portion 27 in an upper region of the side surface of each of the front wheels 2L, 2R. Particularly, as shown in FIG. 33, it is preferred that the side surface-side flow-straightening protrusion 51 be arranged at a height position on an upper portion side of the opening section 30.

Figure 34:
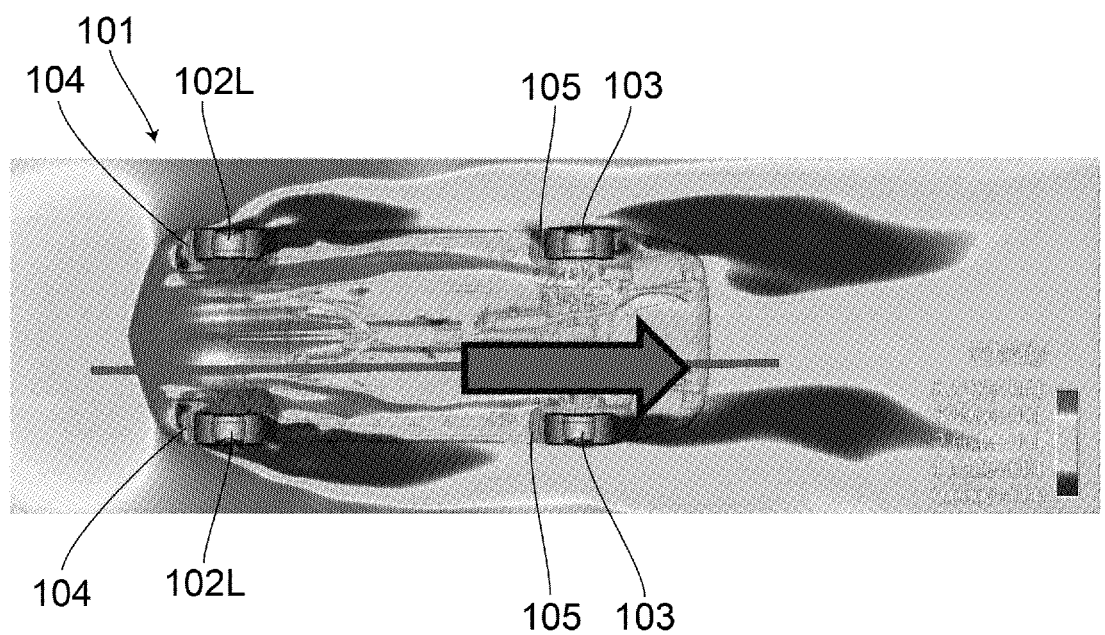
FIG. 34 is a diagram showing flows of a traveling wind flowing along a lower portion of the vehicle under a conventional configuration, in which the vehicle is running straight.

In such case, with the side surface-side flow-straightening protrusion 51 being arranged at a position on the upper portion side of the opening section 30 of the wheel 25, the vehicle 1 exhibited a high-speed straight driving stability and a significantly improved turning performance. Particularly, the vehicle 1 exhibited an improved response and a reduced change in gripping force when turning on an irregular ground. This is an effect achieved by having the side surface-side flow-straightening protrusions 51 straighten the turbulent flows outside the wheel wells 4, 4 in the vehicular width direction as shown in FIG. 34.

Next, no particular effects were achieved as a result of arranging each side surface-side flow-straightening protrusion 51 at a height position of the hub portion 28 in the center of the wheel 25 (a position indicated by a middle arrow(s) in a height direction in FIG. 33). Further, a height position on a lower portion side of the opening section 30 of the wheel 25 (a position indicated by a lower arrow(s) in the height direction in FIG. 33) resulted in a less significant effect of achieving the high-speed straight driving stability as compared to the present embodiment. Here, although improvements in turning performance were observed, the effect of reducing changes in gripping force on an irregular ground was not achieved only when tested on a flat road surface.

That is, the present embodiment corresponds to a third aspect of the present invention. In this embodiment, the front bumper 7 as a bumper has the bumper side surface(s) 13 as side surface portions. Provided on the bumper side surface 13 is the side surface-side flow-straightening protrusion 51 that is formed along the vehicular front-rear direction and is positioned ahead of a side surface upper portion of each of the front wheels 2L, 2R of the vehicle 1. Thus, the turbulent flows outside the front wheels 2L, 2R in the vehicular width direction are straightened, thereby improving the vehicle stability. Here, the side surfaces of the front wheels 2L, 2R of the vehicle 1 in this case are defined as the side surfaces of the outer end portions of the front wheels 2L, 2R in the vehicular width direction with the front wheels 2L, 2R being directed to the front-rear direction of the vehicle 1 running straight.

Further, the effects of the present embodiment are as follows. Since a central part of the side surface-side flow-straightening protrusion 51 in the height direction is located on the upper portion side of the wheel 25, the turbulent flows flowing out of the opening section 30 as well as a clearance(s) between the outer circumference of the tire 26 and the wheel well 4 can be effectively straightened without being affected by a road surface and the hub portion 28.

However, the present invention is not limited to the abovementioned embodiments. The present invention may be exploited in various modified manners within the scope of the gist thereof. For example, the shapes of the flow-straightening protrusions, the flow-straightening groove portions and the side surface-side flow-straightening protrusions are not limited to those described in the above embodiments, but may be selected appropriately; it is preferred that the shapes of these protrusions and groove portions be such that the lengths thereof in a length direction be longer than the lengths thereof in a width direction. Further, the lengths and heights of the flow-straightening protrusions, the flow-straightening groove portions and the side surface-side flow-straightening protrusions are not limited to those described in the above embodiments, but may be selected appropriately as well. Furthermore, although the flow-straightening protrusions and the side surface-side flow-straightening protrusions are integrally formed on the front bumper in the aforementioned embodiments, separate flow-straightening protrusions and side surface-side flow-straightening protrusions may be attached to the front bumper using an attaching tool such as a screw(s). Moreover, the side surface-side flow-straightening protrusions may also be provided on the bumper of the second embodiment.

What is claimed is:

1. A bumper to be attached to a front lower portion of a vehicle, comprising:
    flow-straightening protrusions that are each formed along a vehicular front-rear direction, and are aligned on a lower portion of the bumper along a vehicular width direction, wherein the flow-straightening protrusions are aligned across a region on an extended line of a vehicular width direction inner end of a front wheel of the vehicle,
    wherein the extended line is extended in the vehicular front-rear direction from the vehicular width direction inner end of the front wheel of the vehicle,
    the bumper includes an outer region located on an outer side of the extended line in the vehicular width direction and an inner region located on an inner side of the extended line in the vehicle width direction, and
    the flow-straightening protrusions are provided to the inner region and the outer region.

2. A bumper to be attached to a front lower portion of a vehicle, comprising:
    flow-straightening groove portions that are each formed along a vehicular front-rear direction, and are aligned on a lower portion of the bumper along a vehicular width direction, wherein the flow-straightening groove portions are aligned across a region on an extended line of a vehicular width direction inner end of a front wheel of the vehicle,
    wherein the extended line is extended in the vehicular front-rear direction from the vehicular width direction inner end of the front wheel of the vehicle,
    the bumper includes an outer region located on an outer side of the extended line in the vehicular width direction and an inner region located on an inner side of the extended line in the vehicle width direction, and
    the flow-straightening groove portions are provided to the inner region and the outer region.

3. The bumper according to claim 1, further comprising:
    a side surface portion; and
    a side surface-side flow-straightening protrusion that is formed along the vehicular front-rear direction and is positioned ahead of a side surface upper portion of the front wheel of the vehicle.

4. The bumper according to claim 2, further comprising:
    a side surface portion; and
    a side surface-side flow-straightening protrusion that is formed along the vehicular front-rear direction and is positioned ahead of a side surface upper portion of the front wheel of the vehicle.

5. The bumper according to claim 1, wherein the number of the flow-straightening protrusions provided to the inner region is larger than the number of the flow-straightening protrusions provided to the outer region.

6. The bumper according to claim 2, wherein the number of the flow-straightening groove portions provided to the inner region is larger than the number of the flow-straightening groove portions provided to the outer region.

* * * * *